(12) United States Patent
Simmons et al.

(10) Patent No.: US 12,533,176 B2
(45) Date of Patent: Jan. 27, 2026

(54) APPARATUS AND METHOD PROVIDING A HAND-MOUNTED SURGICAL TOOL

(71) Applicant: UNIVERSITY OF FLORIDA RESEARCH FOUNDATION, INCORPORATED, Gainesville, FL (US)

(72) Inventors: Chelsey Savannah Simmons, Gainesville, FL (US); Christiana M. Shaw, Gainesville, FL (US); Sanda Tan, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 496 days.

(21) Appl. No.: 18/087,139

(22) Filed: Dec. 22, 2022

(65) Prior Publication Data

US 2023/0210582 A1 Jul. 6, 2023

Related U.S. Application Data

(63) Continuation-in-part of application No. PCT/US2021/038610, filed on Jun. 23, 2021.
(Continued)

(51) Int. Cl.
*A61B 18/14* (2006.01)
*A61B 17/00* (2006.01)
(Continued)

(52) U.S. Cl.
CPC ........ *A61B 18/1402* (2013.01); *A61B 90/361* (2016.02); *A61B 2017/00973* (2013.01);
(Continued)

(58) Field of Classification Search
CPC ... A61B 18/1402; A61B 90/361; A61B 90/50; A61B 90/53; A61B 2017/00973;
(Continued)

(56) References Cited

U.S. PATENT DOCUMENTS 9,451,882 B2    9/2016   Nie et al.
9,788,776 B1   10/2017   Thompson et al.
(Continued)

FOREIGN PATENT DOCUMENTS

AU    2009200197 B2   2/2009
CA       2724973      8/2015
(Continued)

OTHER PUBLICATIONS

PCT Search Report & Written Opinion, PCT/US2021/038610, Mailed Dec. 6, 2021, 11 pages.
(Continued)

*Primary Examiner* — Beverly M Flanagan
(74) *Attorney, Agent, or Firm* — Timothy H. Van Dyke; Wolter Van Dyke Davis, PLLC

(57) ABSTRACT

A method and apparatus for providing hand-mounted surgical tools is provided. The apparatus includes a housing configured to be mounted to a body of a user. The apparatus also includes an optical source to generate a first optical signal in an absorption spectrum of a biocompatible fluorescing dye (BFD). The apparatus also includes an optical detector to detect a second optical signal in an emission spectrum of the BFD. The apparatus also includes a processor to receive a signal from the optical detector that indicates that the second optical signal was detected by the optical detector. The processor is further configured to cause the apparatus to transmit a signal to a non-visual feedback device to cause the non-visual feedback device to output
(Continued)

non-visual feedback to the user that the second optical signal was detected by the optical detector.

11 Claims, 30 Drawing Sheets

Related U.S. Application Data

(60) Provisional application No. 63/042,642, filed on Jun. 23, 2020.

(51) Int. Cl.
*A61B 18/00* (2006.01)
*A61B 90/00* (2016.01)

(52) U.S. Cl.
CPC ........ *A61B 2018/00178* (2013.01); *A61B 2018/00595* (2013.01); *A61B 2018/00601* (2013.01); *A61B 2018/00642* (2013.01); *A61B 2018/00702* (2013.01); *A61B 2018/00898* (2013.01); *A61B 2018/1475* (2013.01); *A61B 2218/007* (2013.01)

(58) Field of Classification Search
CPC ......... A61B 2018/00595; A61B 2018/00178; A61B 2018/00601; A61B 2018/00642; A61B 2018/00702; A61B 2018/00898; A61B 2018/1475; A61B 2218/007; A61B 42/10; A61B 42/20
USPC ............................................. 606/41
See application file for complete search history.

(56) References Cited

U.S. PATENT DOCUMENTS

| | | | | |
|---|---|---|---|---|
| 11,986,341 | B1* | 5/2024 | Singh | A61B 5/6852 |
| 2003/0229267 | A1* | 12/2003 | Belson | A61B 1/00082 |
| | | | | 600/109 |
| 2006/0206109 | A1* | 9/2006 | Swanson | A61B 18/14 |
| | | | | 606/41 |
| 2006/0270919 | A1 | 11/2006 | Brenner | |
| 2007/0093807 | A1* | 4/2007 | Baxter | A61B 42/10 |
| | | | | 606/49 |
| 2008/0077177 | A1 | 3/2008 | Goldin | |
| 2012/0123404 | A1* | 5/2012 | Craig | A61B 42/10 |
| | | | | 606/41 |
| 2013/0046302 | A1* | 2/2013 | Schneider | A61B 42/00 |
| | | | | 606/42 |
| 2014/0025059 | A1* | 1/2014 | Kerr | A61B 18/14 |
| | | | | 606/33 |
| 2014/0276103 | A1 | 9/2014 | Lee et al. | |
| 2015/0182118 | A1 | 7/2015 | Bradbury et al. | |
| 2017/0007356 | A1* | 1/2017 | Wykes | A61B 18/1402 |
| 2018/0055591 | A1 | 3/2018 | Bonny et al. | |
| 2018/0280017 | A1 | 10/2018 | El-Ayoubi et al. | |
| 2019/0343432 | A1 | 11/2019 | Harris et al. | |
| 2020/0261145 | A1* | 8/2020 | Lowry | A61B 18/1402 |
| 2020/0390496 | A1* | 12/2020 | Houden | A61B 90/37 |

FOREIGN PATENT DOCUMENTS

| | | | | |
|---|---|---|---|---|
| CN | 112022328 A | * | 12/2020 | ............ A61B 18/12 |
| WO | 199800068 A1 | | 1/1998 | |
| WO | WO-2004026108 A2 | * | 4/2004 | ............ A61B 42/10 |
| WO | 2009097091 A2 | | 8/2009 | |
| WO | WO-2017062348 A1 | * | 4/2017 | ......... A61B 18/1402 |

OTHER PUBLICATIONS

Van Driel, M. et al., "Characterization and Evaluation of the Artemis Camera for Fluorescence-Guided Cancer Surgery",Molecular Imaging and Biology, vol. 17, Issue: 3, p. 413-23, Date: 2015.

Stummer et al., "Fluorescence-guided surgery with 5-aminolevulinic acid for resection of malignant glioma: a randomised controlled multicentre phase III trial", The Lancet Oncology, vol. 7, Issue: 5, p. 392-401, Date: May 1, 2006.

* cited by examiner

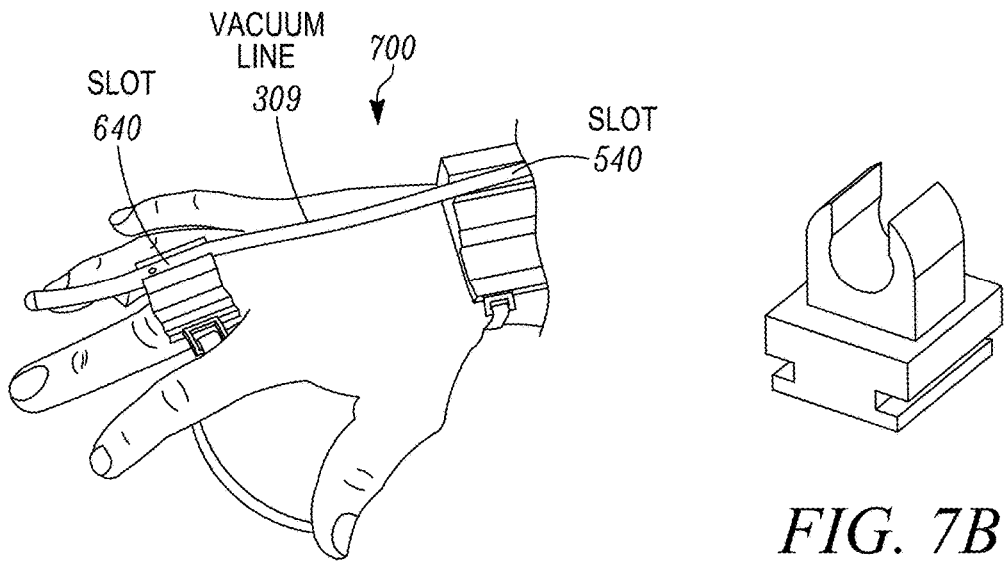
FIG. 7A
FIG. 7B
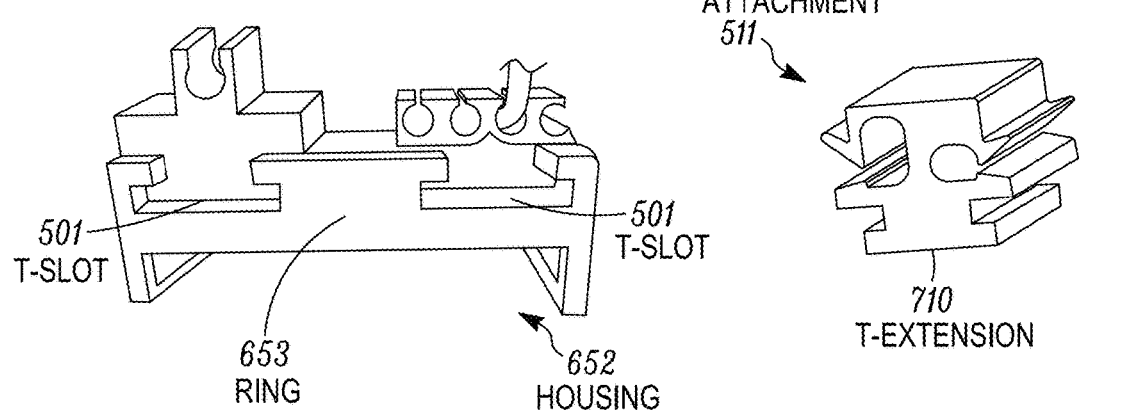
FIG. 7C
FIG. 7D
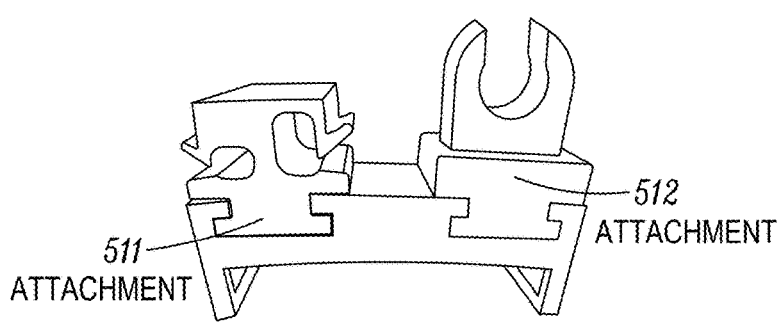
FIG. 7E
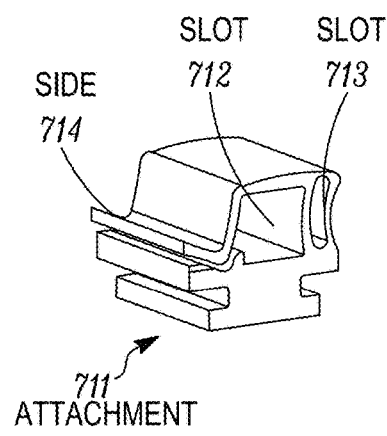
FIG. 7F

APPARATUS AND METHOD PROVIDING A HAND-MOUNTED SURGICAL TOOL

BACKGROUND

Various conventional surgical tools are well known and are used in different surgical procedures. Some of these conventional tools are used in the context of identification of tissues and cells (e.g. using biocompatible fluorescent dye). Other examples of these conventional tools are used in the context of performing electrocautery.

SUMMARY

The inventors of the present invention recognized that conventional surgical techniques involve a surgeon using their hand to palpate regions of interest (ROI). When the surgeon locates the ROI, they must move their hands to pick up a cutting instrument, thereby losing track of the ROI. Additionally, the inventors of the present invention recognized that conventional cutting instruments (e.g. pencil shaped cauterizing tool) cannot be maneuvered into small areas. To overcome these notable drawbacks of conventional surgical techniques, the inventors of the present invention developed a novel surgical tool that can be clamped or mounted to the finger (e.g. knuckle) of the surgeon. This alleviates the surgeon from moving their hands after palpating a ROI. Additionally, the compact dimension of the novel tool permits the surgeon to maneuver the surgical tool into small areas.

The inventors of the present invention also recognized that conventional laparoscopic surgical techniques involve the use of biocompatible fluorescing dyes (BFD) in conjunction with optical devices to identify anatomical features of interest and provide visual feedback (e.g. on a display) to the surgeon. However, the inventors of the present invention recognized that using BFD to identify anatomical features is difficult in open surgical procedures, where a single large microscope/camera is mounted above the patient and thus the microscope/camera cannot be navigated into small incisions or under tissue/organs. Additionally, since fluorescence of BFD decays with increased distance from the emission source, the inventors of the present invention recognized that even use of different filtering lenses may not accurately detect the concentration and location of the dye. To overcome these notable drawbacks of the use of BFD in optical surgical procedures, the inventors developed a novel surgical tool that can be clamped or mounted to the hand (e.g. finger) and thus can be utilized in open surgical procedures to identify anatomical features of interest. The inventors of the present invention also designed the novel surgical tool to provide non-visual real-time feedback (e.g. audio feedback) to the surgeon, which demonstrates further improvement over conventional techniques that provide visual feedback and thus require the surgeon look away from the surgical site.

In a first set of embodiments, an apparatus is provided that discloses a hand-mounted surgical tool. The apparatus includes a housing configured to be mounted to a body of a user. The apparatus also includes an optical source coupled to the housing and configured to generate a first optical signal in an absorption spectrum of a biocompatible fluorescing dye (BFD). The apparatus also includes an optical detector coupled to the housing and configured to detect a second optical signal in an emission spectrum of the BFD. The apparatus also includes a power source and electrically connected to the optical source and the optical detector. The apparatus also includes a processor and communicatively coupled with the optical source, the optical detector and the power source. The apparatus also includes a memory including one or more sequences of instructions. The memory and the one or more sequences of instructions are configured to, with the processor, cause the apparatus to transmit a first signal to the power source to cause the power source to transmit electrical power to the optical source to generate the first optical signal. The memory and processor are further configured to cause the apparatus to receive a second signal from the optical detector that indicates that the second optical signal was detected by the optical detector. The memory and processor is further configured to cause the apparatus to transmit a third signal to a non-visual feedback device to cause the non-visual feedback device to output non-visual feedback to the user that the second optical signal was detected by the optical detector.

In a second set of embodiments, an apparatus is provided that discloses a hand-mounted surgical tool. The apparatus includes a housing configured to be mounted to a body of a user. The apparatus further includes an electrode coupled to the housing such that a tip of the electrode is configured to move from a first position relative to the housing to a second position relative to the housing. The apparatus further includes a power source electrically connected to the electrode and a processor communicatively coupled with the power source. The apparatus further includes a memory including one or more sequences of instructions. The memory and the sequences of instructions is configured to, with the processor, cause the apparatus to receive a first signal from a first user input device based on a first user input received from the user and transmit a second signal to the power source to cause the power source to deliver electrical power to the electrode based on the received first signal. The memory and the sequences of instructions is further configured to cause the processor to receive a third signal from the first user input device based on an input received from the user and transmit a fourth signal to the power source to cause the power source to stop delivering electrical power to the electrode based on the received third signal.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIGS. 7A through 7F are images that illustrates an example of various housings and attachments providing a finger and wrist mounted surgical tool for the apparatus of FIG. 3A, according to an embodiment;

DETAILED DESCRIPTION

Figure 1A:
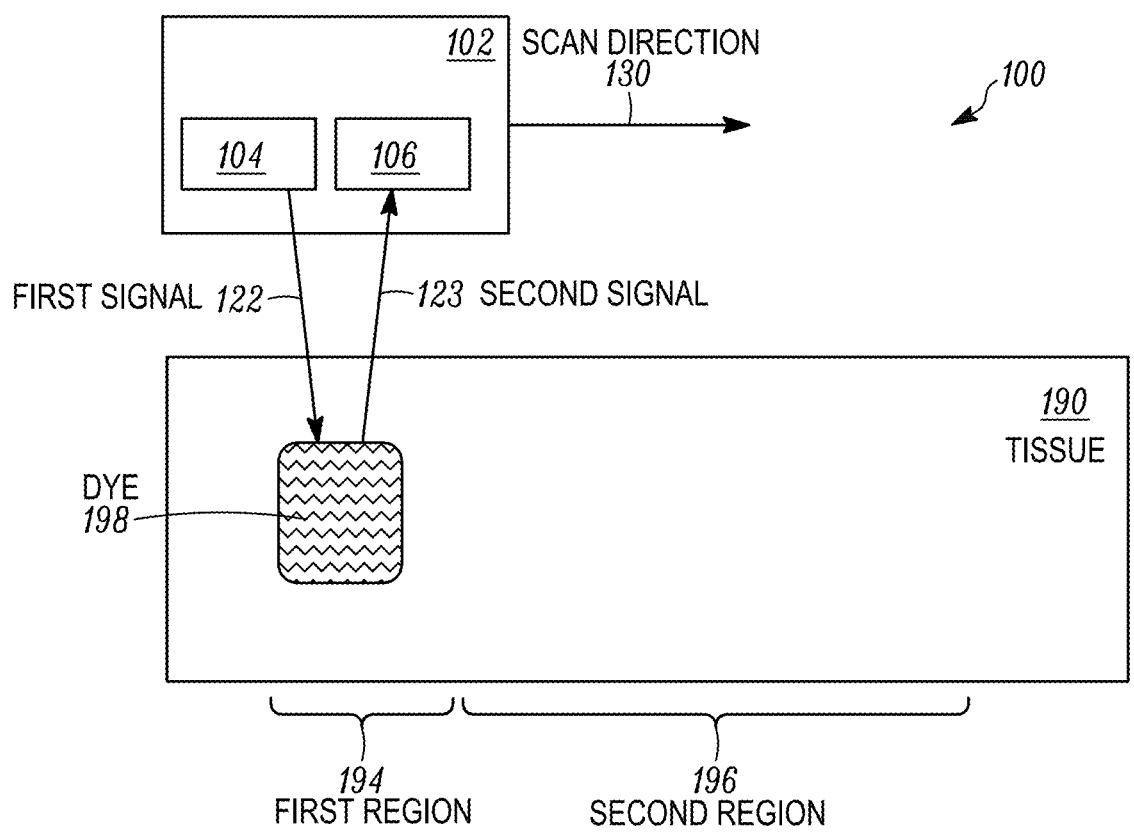
FIG. 1A is a schematic block diagram that illustrates an example of an apparatus providing a hand-mounted surgical tool moved along tissue of a subject, according to an embodiment.

A method and apparatus are described for providing a hand-mounted tool for use in surgical procedures. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5x to 2x, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of hand-mounted surgical tools used in various surgical procedures. For purposes of this description, "housing" means one or more components that are configured to be directly or indirectly mounted to a body of a user and are used to facilitate positioning of other components of the apparatus relative to the body. The housing can include one or more housings, such as a first housing that is mounted to a finger or knuckle of the user and a second housing that is mounted to a wrist of the user, where both the first and second housings are used to facilitate positioning of other components (e.g. optical source, optical detector, electrode, vacuum tube, electrical cables to one or more components of the apparatus, etc.) of the apparatus relative to the body. For purposes of this description, "hand-mounted" means mounted to one or more of the wrist, one or more knuckles, one or more fingers or any other region of the hand.

However, the invention is not limited to this context. In other embodiments, the invention is described in the context of finger-mounted surgical tools used in various surgical procedures (e.g. open surgery). In still other embodiments, the invention can be used in the context of veterinary surgery. In still other embodiments, the invention can be used in the context of diagnosis (e.g. in a clinic).

Overview

In a first set of embodiments, depicted in FIGS. 1A-1B and 2A-2B, a hand-mounted surgical tool is discussed which can be used to identify anatomical features of interest and/or permit visual identification of cells and tissues within a subject. FIG. 1A is a schematic block diagram that illustrates an example of an apparatus 100 providing a hand-mounted surgical tool moved along tissue 190 of a subject, according to an embodiment. In an embodiment, the tissue 190 and the subject are not components of the apparatus 100. In one embodiment, a biocompatible fluorescent dye 198 (BFD), such as indocyanine green (ICG), is injected within the tissue 190 for purposes of identifying anatomical features of interest and/or permit visual identification of cells and tissues (e.g. cancer cells, cancer organs or tumors, cells in dishes, normal non-cancerous organs such as parathyroid or ureter, etc.). As shown in FIG. 1A, the presence of dye 198 in a first region 194 of the tissue 190 and absence in the second region 196 of the tissue 190 is used to identify one or more anatomical features of interest and/or permit visual identification of cells or tissues within the first region 194 and/or identify an absence of such anatomical features or cells/tissues in the second region 196.

In an embodiment, the apparatus 100 includes a housing 102 and an optical source 104 (e.g. light emitting diode or LED) coupled or operatively connected to the housing 102 that is configured to generate a first optical signal 122. In one embodiment, the optical source 104 is positioned within the housing 102. In other embodiments, the optical source 104 is outside the housing 102 (e.g. mounted to an external surface of the housing 102). In an example embodiment, the first optical signal 122 is within an absorption spectrum of the BFD 198. In an example embodiment, the first optical signal 122 has a wavelength of about 780 nanometers (nm) or in a range from about 600 nm to about 900 nm.

In an embodiment, the apparatus 100 includes an optical detector 106 coupled to or operatively connected to the housing 102 that is configured to detect a second optical signal 123. In one embodiment, the optical detector 106 is positioned within the housing 102. In other embodiments, the optical detector 106 is outside the housing 102 (e.g. mounted to an external surface of the housing 102). In an example embodiment, the second optical signal 123 is within an emission spectrum of the BFD 198. In an example embodiment, the optical detector 106 includes a bandpass filter to filter out optical signals with a wavelength less than a threshold wavelength (e.g. about 820 nm or in a range from about 700 nm to about 1000 nm). In an example embodiment, the threshold wavelength of the bandpass filter is based on the emission spectrum of the BFD 198 (e.g. a minimum wavelength of the emission spectrum). Additionally, although FIG. 1A depicts a distinct optical source 104 and optical detector 106, in some embodiments the optical source 104 and optical detector 106 are combined into a single optical transceiver.

In an embodiment, after the apparatus 100 is mounted to a hand of the user, the user moves the apparatus 100 along a surface of the tissue 190 in a scan direction 130 (FIG. 1A).

As the apparatus 100 is scanned along the surface of the tissue 190, the optical source 104 transmits the first optical signal 122 that is absorbed by the BFD 198 in a first region 194 of the tissue 190. Due to the absorption of the first optical signal 122, the BFD 198 fluoresces the second optical signal 123, which is detected by the optical detector 106. Based on the detected second optical signal 123, the apparatus 100 features an algorithm to determine that the BFD 198 is within the first tissue region 194 (e.g. for purposes of identifying anatomical regions of interest and/or visually identify cells or tissues within the first region 194).

Figure 1B:
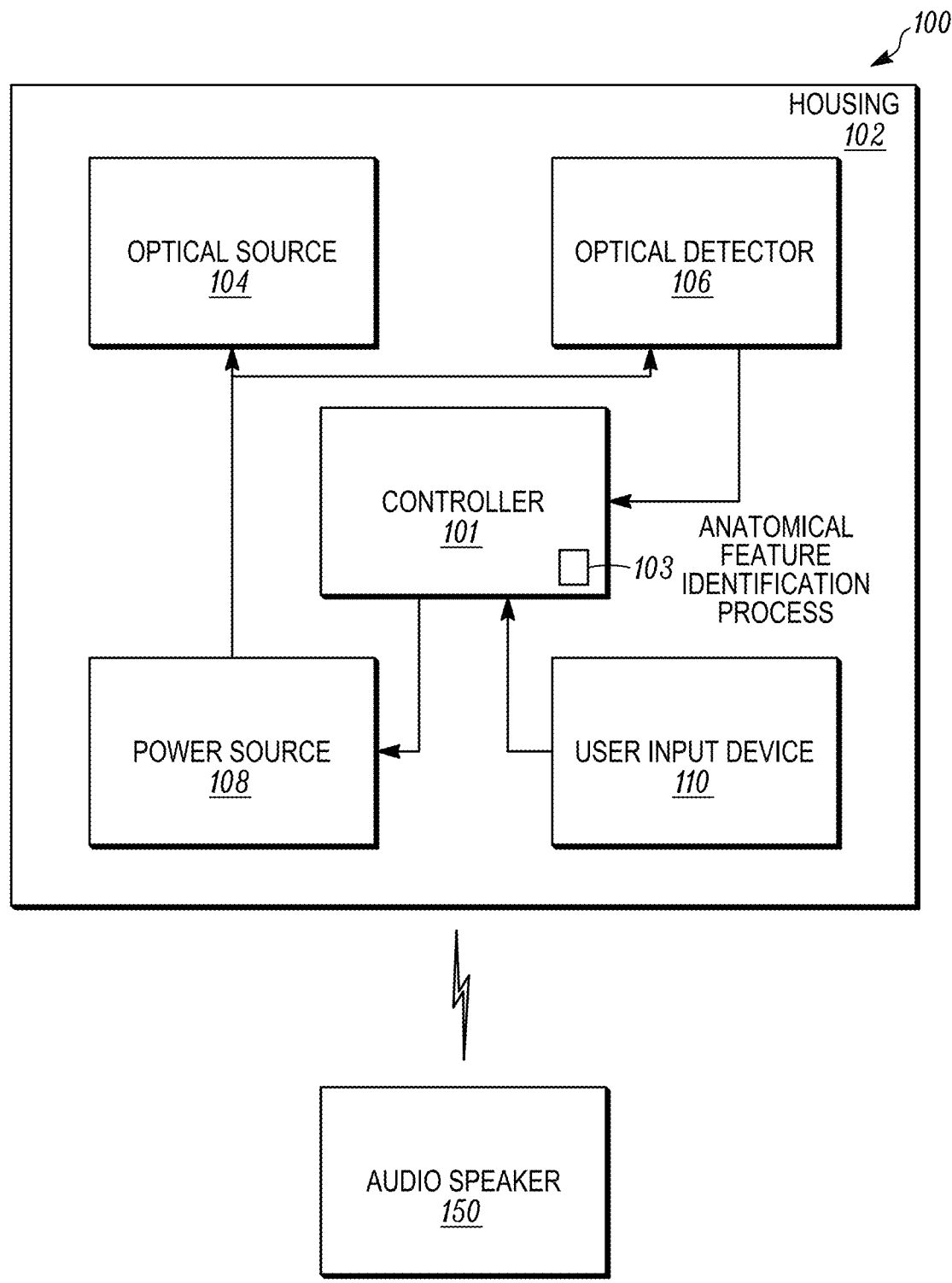
FIG. 1B is a block diagram of the apparatus of FIG. 1A, according to an embodiment.

FIG. 1B is a block diagram of the apparatus 100 of FIG. 1A, according to an embodiment. Although FIG. 1B depicts the optical source 104 and the optical detector 106 within the housing 102, in other embodiments the optical source 106 and optical detector 106 are positioned outside the housing 102 (e.g. mounted to an exterior surface of the housing 102). In an embodiment, the apparatus 100 includes a power source 108 (e.g. battery) electrically connected to the optical source 104 and optical detector 106. In one embodiment, the power source 108 is positioned within the housing 102. In an embodiment, the apparatus 100 also includes a controller 101 communicatively coupled with the optical source 104, the optical detector 106, the power source 108 and a user input device 110. In one embodiment, the controller 101 is positioned within the housing 102. In an example embodiment, the user input device 110 is a button or switch on an external surface of the housing 102 and is pressed or pushed by the user to activate the apparatus 100. Although FIG. 1A depicts that the power source 108 and controller 101 are positioned within the housing 102, in some embodiments, the power source 108 and/or the controller 101 are positioned outside the housing 102. In one example embodiment, the optical source 104 and optical detector 106 are coupled to the housing 102 that is mounted to the hand (e.g. finger or knuckle) of the user and electrical cables from the optical source 104 and optical detector 106 pass along a hand or forearm of the user and attach to the power source 108 that is mounted to the wrist or forearm of the user (e.g. the power source 108 is coupled to a second housing that is mounted to the wrist or the forearm of the user). In another example embodiment, the controller 101 and audio speaker 150 are similarly mounted to the wrist or forearm of the user (e.g. the controller 101 and audio speaker 150 are coupled to the same second housing as the power source 108). Similarly, the user input device 110 need not be positioned within or on an external surface of the housing 102 and in some embodiments the user input device 110 is an external component (e.g. mobile device such as a mobile phone that wirelessly transmits a signal to the controller 101 to activate the apparatus 100).

In an embodiment, the apparatus 100 also includes a non-visual feedback device (e.g. audio speaker 150) that is communicatively coupled (e.g. wirelessly) to the controller 101. In an embodiment, as the apparatus 100 is moved along the tissue 190 in the scan direction 130 (FIG. 1A), the non-visual feedback device is configured to provide the user with non-visual feedback (e.g. audio, haptic, etc.) when the BFD 198 is detected in the first region 194 of the tissue 190. This advantageously permits the user (e.g. surgeon) to identify anatomical features of interest and/or identify cells or tissues within the first region 194 and/or perform one or more steps of a surgical process (e.g. open surgery) based on this identification. In one embodiment, the non-visual feedback device is an audio speaker 150 and provides an audio sound or is a haptic device that provides haptic feedback to the user.

Figure 13:
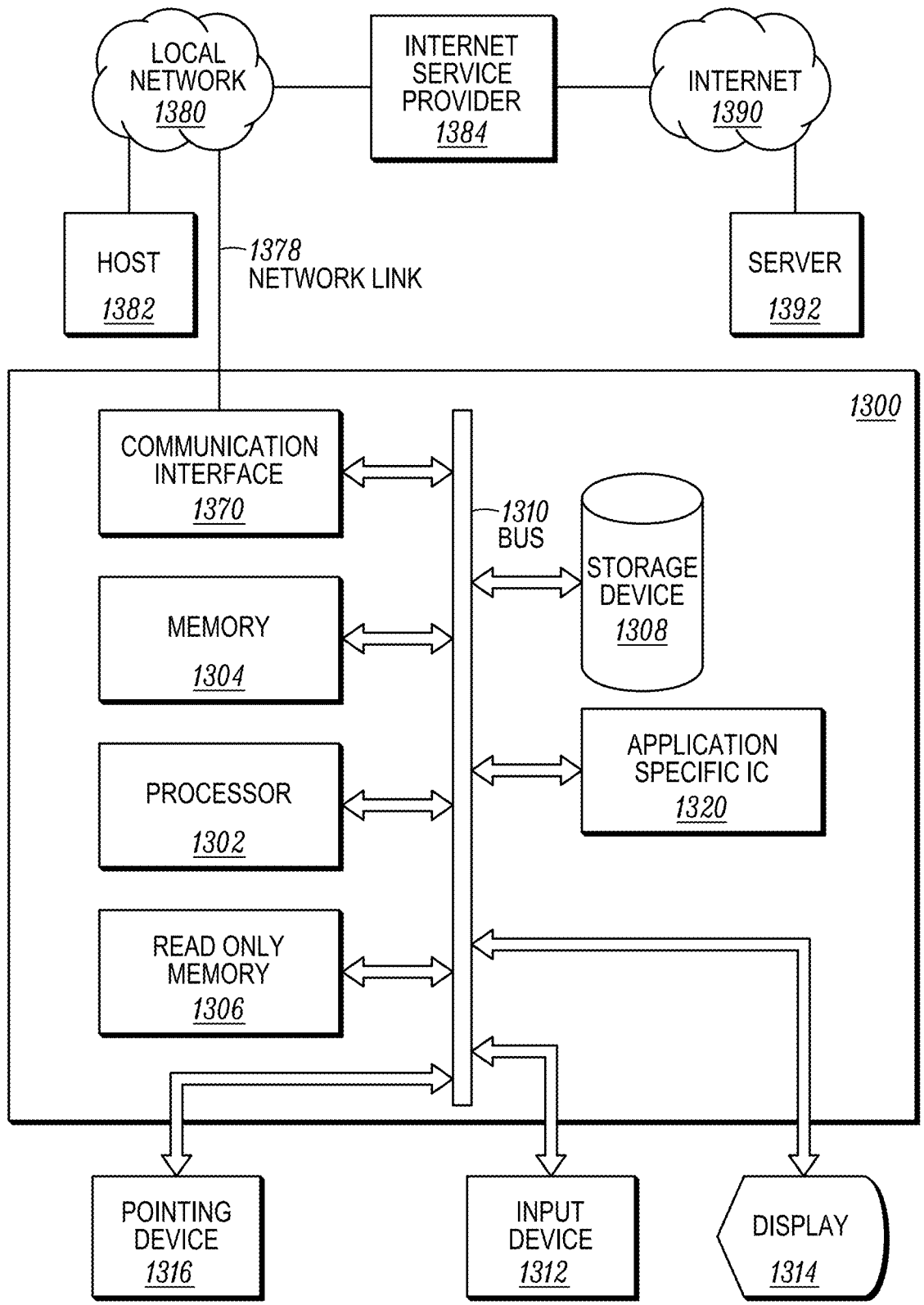
FIG. 13 is a block diagram that illustrates an example computer system upon which an embodiment of the invention may be implemented.
Figure 14:
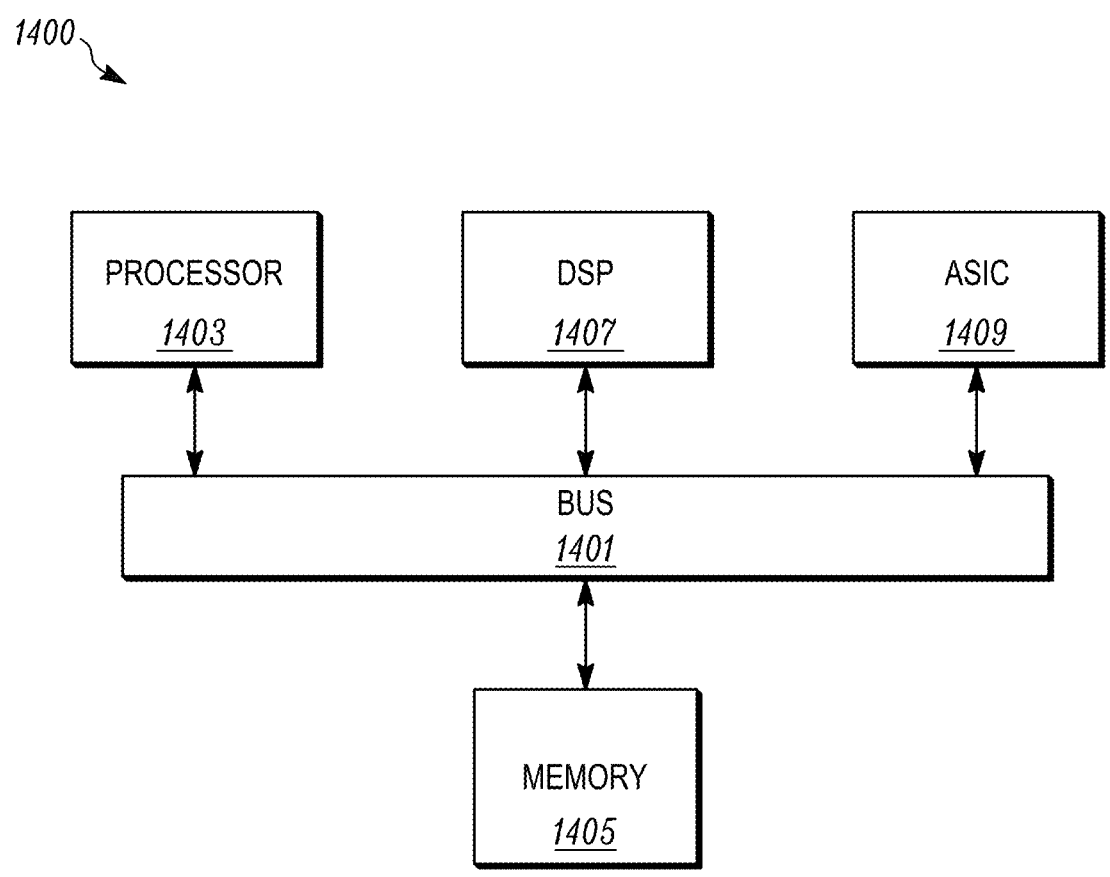
FIG. 14 is a block diagram that illustrates an example chip set upon which an embodiment of the invention may be implemented.
Figure 15:
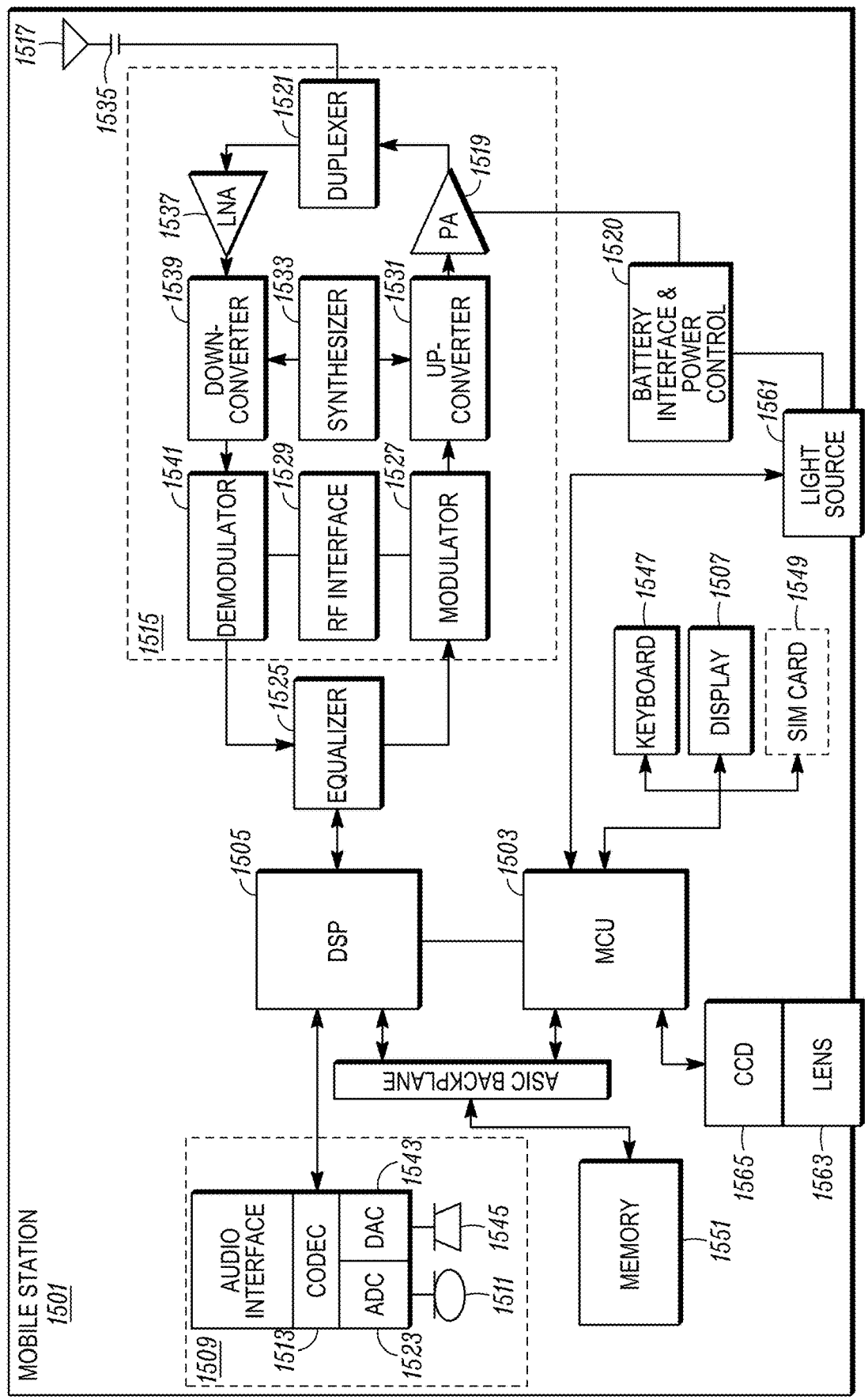
FIG. 15 is a block diagram that illustrates a mobile terminal upon which an embodiment of the invention may be implemented.
Figure 16:
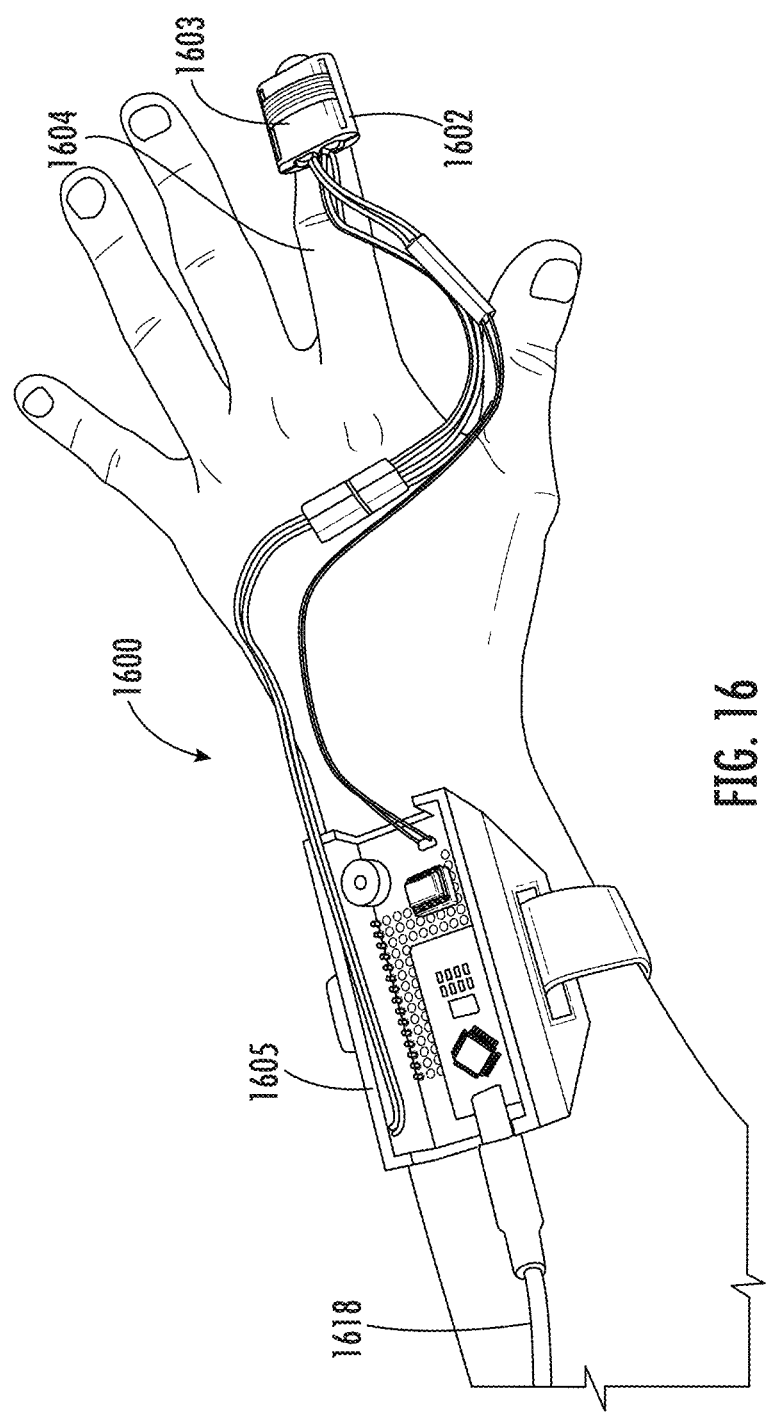
FIG. 16 shows an example of a finger mounted spectrofluorometer system.
Figure 17A:
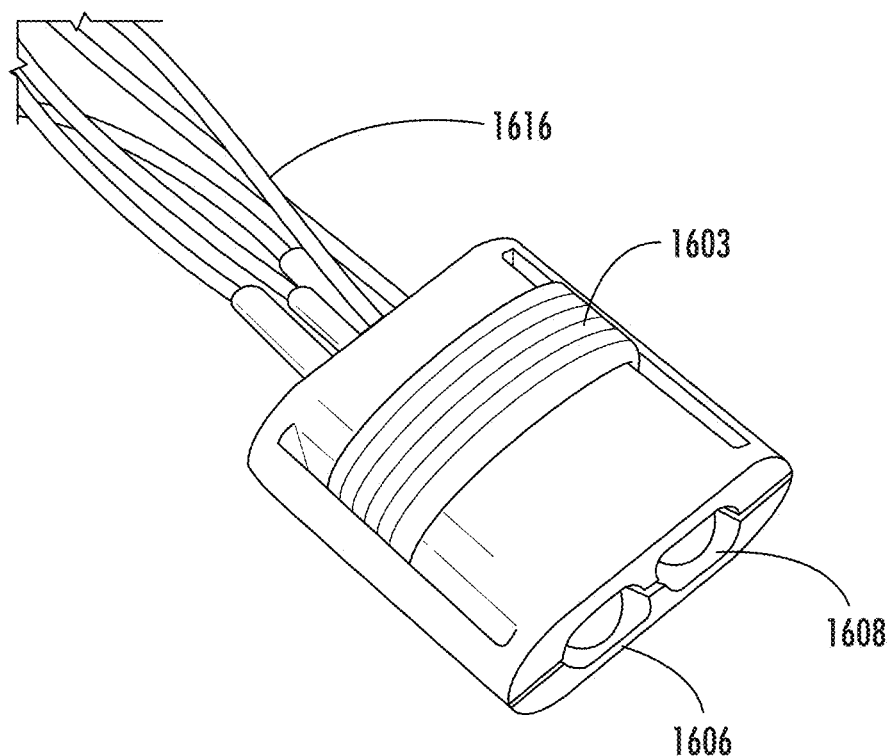
FIG. 17 shows two different images of a finger mount module as part of the system shown in FIG. 16.
Figure 17B:
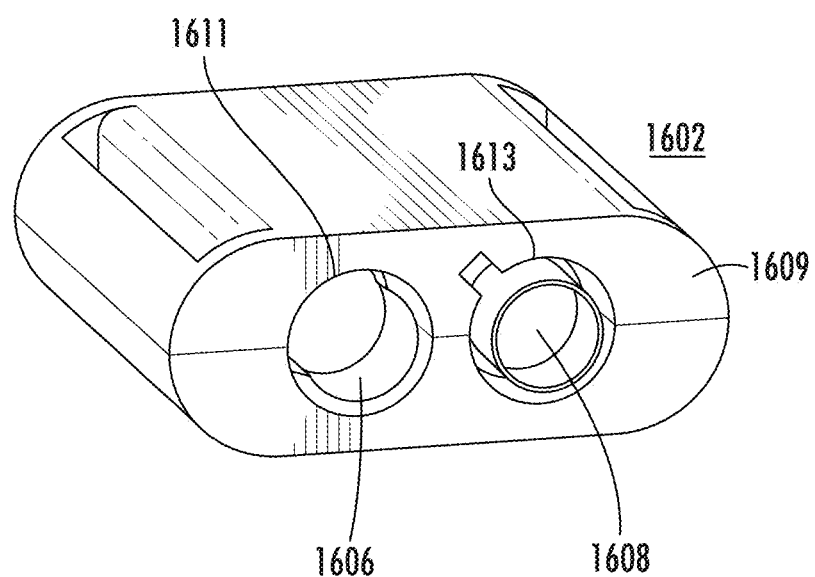
Figure 18A:
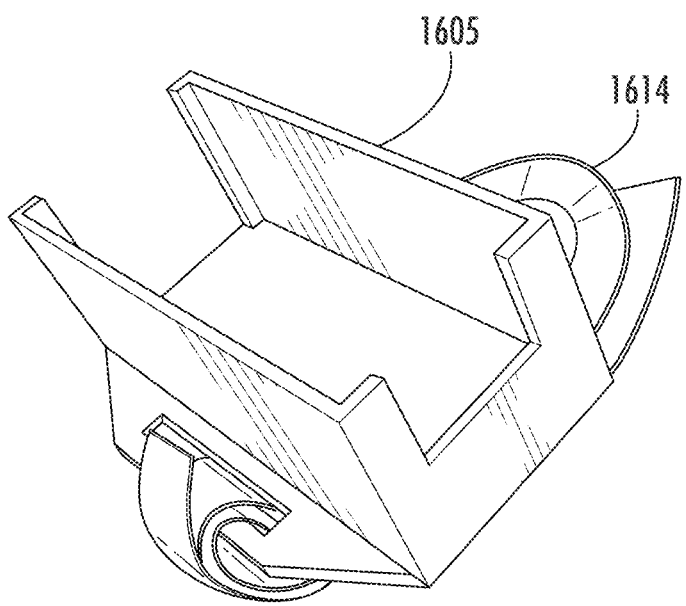
FIG. 18 shows two different images of a wrist mount module as part of the system shown in FIG. 16.
Figure 18B:
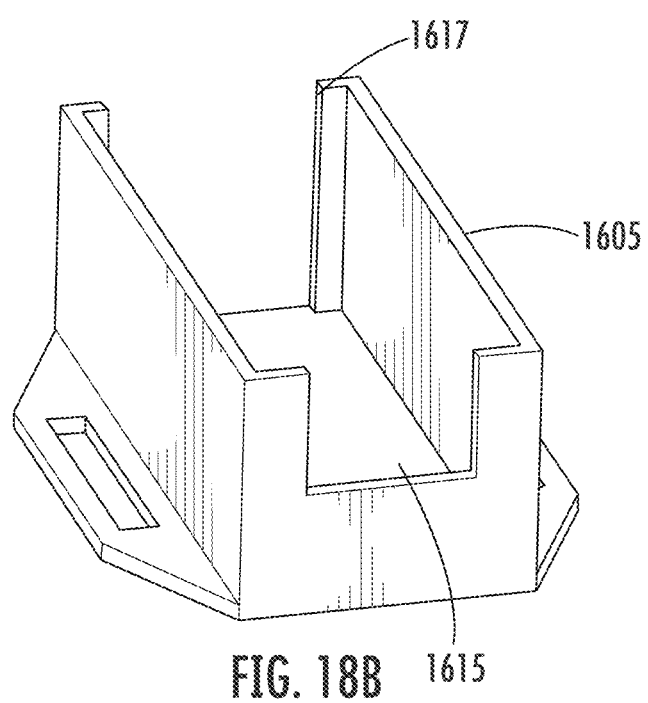

In an embodiment, the controller 101 includes an anatomical feature identification process 103 to cause the apparatus 100 to perform one or more steps of a method described below with reference to FIG. 11. In various embodiments, the controller 101 comprises one or more general purpose computer systems or upgraded computer systems that include graphics processing units, as depicted in FIG. 13 or one or more chip sets as depicted in FIG. 14 or one or more mobile stations 1501 as depicted in FIG. 15, and instructions to cause the computer or chip set or mobile station to perform one or more steps of a method described below with reference to FIG. 11.

Figure 2A:
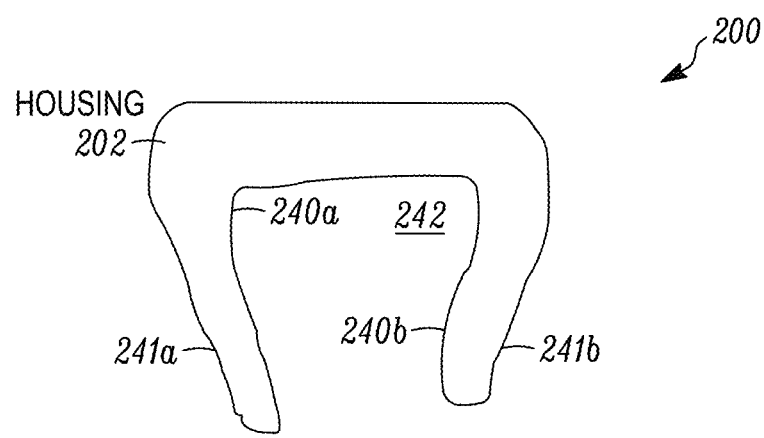
FIG. 2A is a schematic diagram that illustrates an example of the apparatus of FIG. 1A providing a finger-mounted surgical tool, according to an embodiment.
Figure 2B:
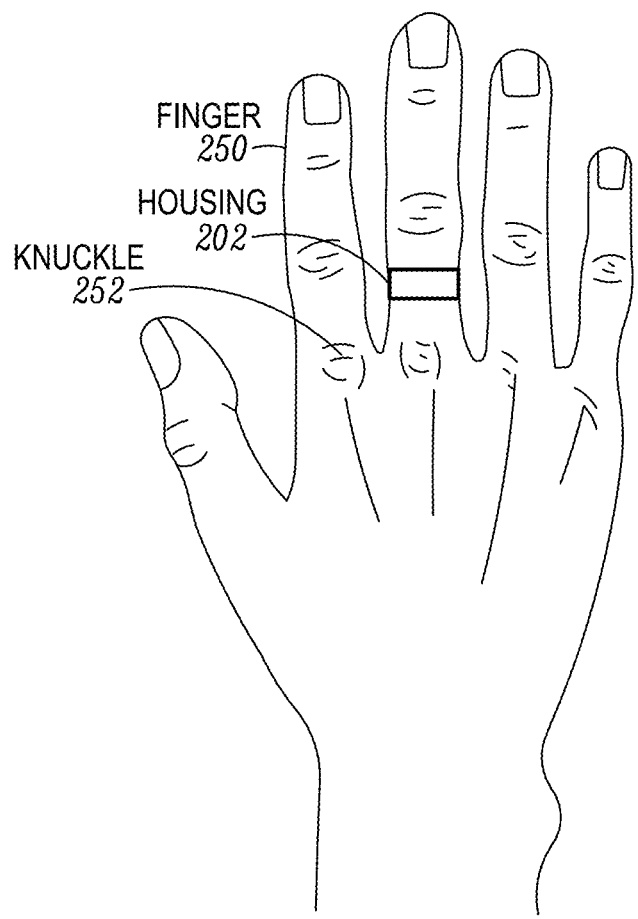
FIG. 2B is a schematic diagram that illustrates the apparatus of FIG. 2A mounted on a finger of a user, according to an embodiment.

FIG. 2A is a schematic diagram that illustrates an example of an apparatus 200 of FIG. 1A providing a finger-mounted surgical tool, according to an embodiment. In an embodiment, the apparatus 200 is similar to the apparatus 100 of FIG. 1A, with the exception of the features discussed herein. In an embodiment, the apparatus 200 includes a housing 202 that is similar to the housing 102 and is configured to be mounted to a hand (e.g. finger, wrist, etc.) of a user. In an embodiment, the housing 202 defines an opening 242 with arcuate surfaces 240a, 240b that are configured to mount the housing 202 to a hand (e.g. finger, wrist, etc.) of the user. In an example embodiment, the arcuate surfaces 240a, 240b have a concave radius of curvature that is based on a convex radius of curvature of a surface of the finger or wrist. FIG. 2B is a schematic diagram that illustrates the apparatus 200 of FIG. 2A mounted on a finger 250 of a user, according to an embodiment. In an example embodiment, the housing 202 is mounted to the finger 250 adjacent to a knuckle 252. Although FIG. 2B depicts the housing 202 mounted to a middle finger of the hand, in other embodiments the housing 202 can be mounted to any finger (or thumb) of the user and/or to the wrist of the user.

In an embodiment, the opening 242 is sized to accommodate the mounting of the housing 202 to the wrist or finger 250. In an example embodiment, a dimension (e.g. length, width, etc.) of the opening 242 is sized based on a dimension of the wrist or finger 250 (e.g. length, width, etc.). In an example embodiment, the dimension of the opening 242 is slightly smaller than the dimension of the wrist or finger 250, to provide frictional engagement between the housing 202 and the wrist or finger 250. In an example embodiment, the housing 202 has a diameter within a range from about 1 centimeter (cm) to about 2 cm and/or within a range from about 0.5 cm to about 4 cm. In another example embodiment, the housing 202 has a length within a range from about 1 cm to about 5 cm.

In an example embodiment, the housing 202 is made from a flexible (e.g. elastic, rubber, etc.) material such that the housing 202 can be moved from a first position (e.g. by pulling on opposite sides 241a, 241b of the housing 202 to enlarge the opening 242) to a second position (e.g. releasing opposite sides 241a, 241b of the housing 202 so the opening 242 returns to an initial size). In this example embodiment, the housing 202 is mounted to the wrist or finger 250 by moving the housing 202 to the first position, inserting the wrist or finger 250 through the enlarged opening 242 and then releasing the housing 202 so that the opening 242 returns to an initial size and frictionally engages the finger 250.

In some embodiments, the apparatus 200 is provided with a single-use disposable cover (not shown) that encloses the housing 202. The single-user cover advantageously protects the housing 202 from pathogens. In an example embodiment, the housing 202 is sterilizable. After each use of the housing 202, the single-use disposable cover is removed and the housing 202 is sterilized (e.g. before a subsequent use of the housing 202).

Figure 11:
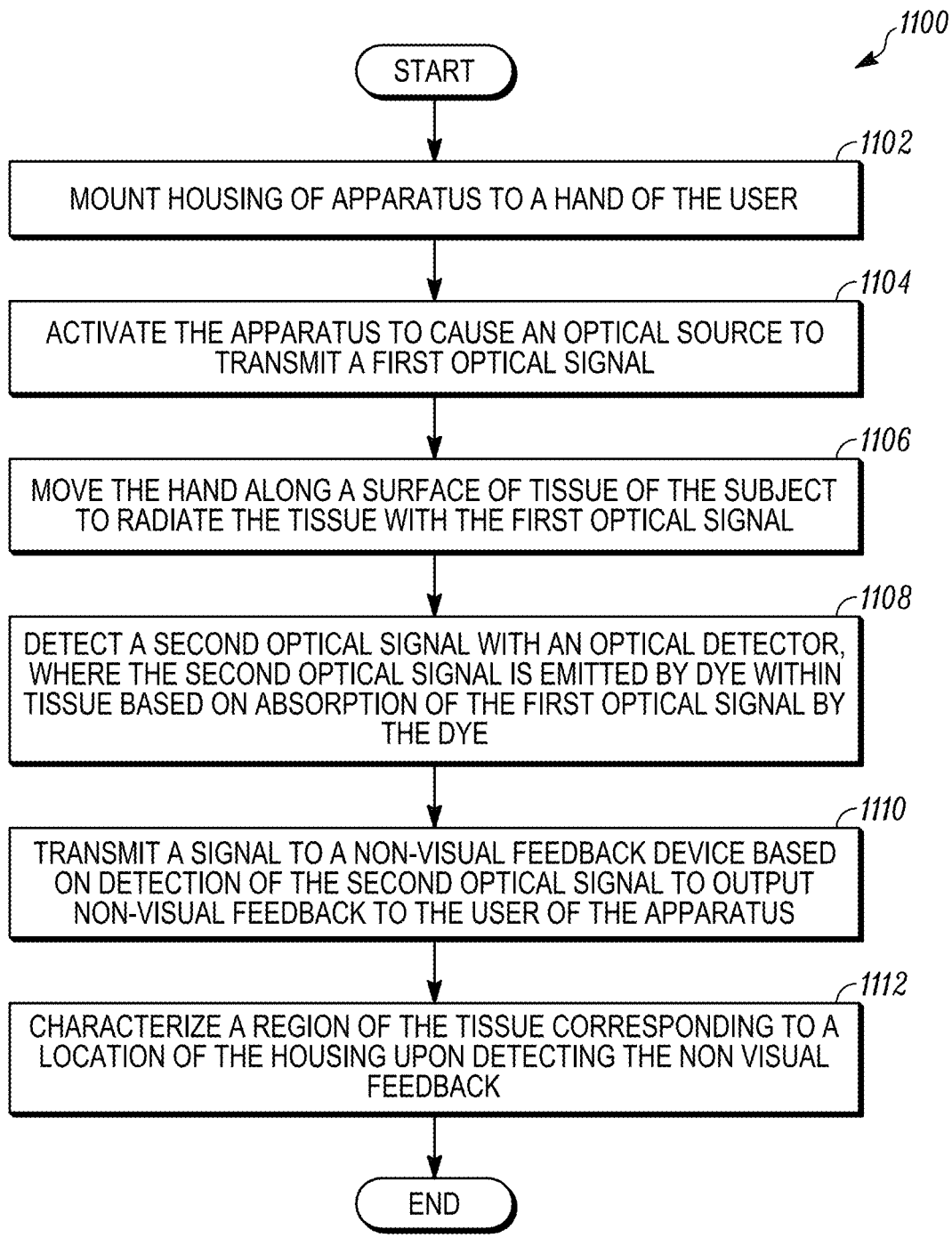
FIG. 11 is a flowchart that illustrates an example of a method for using the apparatus of FIG. 1A, according to an embodiment.

FIG. 11 is a flowchart that illustrates an example of a method 1100 for using the apparatus 100 of FIG. 1A or the apparatus 200 of FIG. 2A, according to an embodiment. Although steps are depicted in FIG. 11, and in subsequent flowchart FIG. 12, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In an embodiment, in step 1102 the housing 102, 202 is mounted to a hand of a user. In one embodiment, in step 1102 the housing 101, 202 is mounted to a finger 250 or wrist of the user (e.g. adjacent the knuckle 252). In an example embodiment, in step 1102 the sides 241a, 241b of the housing 202 are spread apart to enlarge the opening 242. In this example embodiment, the finger 250 (or wrist) is then passed between the spread apart sides 241a, 241b of the housing 202 and into the enlarged opening 242. In this example embodiment, after the finger 250 is positioned within the opening 242, the sides 241a, 241b are released so that they move inward and frictionally engage the finger 250. Although FIG. 2A depicts that the housing 202 is open (e.g. a partial ring where the opening 242 is not enclosed by the housing 202), in other embodiments the housing 202 encloses the opening 242 (e.g. complete ring). Additionally, although FIG. 2A depicts a single housing 202 configured to be mounted to the wrist or finger, in other embodiments multiple housings are provided (e.g. one housing is mounted to a finger of the user and a second housing is mounted to a wrist of the user).

In an embodiment, in step 1104 the apparatus 100, 200 is activated to cause the optical source 104 to transmit the first optical signal 122. In an example embodiment, in step 1104 the user provides input to the user input device 110 (e.g. presses the button on the exterior surface of the housing 102) to activate the apparatus 100. In an example embodiment, the user input device 110 is communicatively coupled to the controller 101 (FIG. 1B) and the user input device 110 transmits a signal to the controller 101 upon receiving the user input. In this example embodiment, upon receiving the signal from the user input device 110, the controller 101 transmits a signal to the power source 108 to cause the power source 108 to deliver electrical power to the optical source 104 and the optical detector 106. In this example embodiment, the optical source 104 transmits the first optical signal 122 upon receiving the electrical power from the power source 108.

In an embodiment, in step 1106 the user moves their hand (and mounted apparatus 100, 200) along a surface of tissue 190 of the subject. In an example embodiment, in step 1106 the user moves their hand (and mounted apparatus 100, 200) in the scan direction 130. In another example embodiment, in step 1106 the user orients the housing 102 such that the optical source 104 and optical detector 106 are aligned with the tissue 190 such that the first signal 122 is directed at the tissue 190. In an embodiment, in step 1106 the tissue 190 of the subject is radiated with the first optical signal 122 from the optical source 102. In some embodiments, in step 1106 the user (e.g. surgeon) palpates the surface of the tissue 190 with the apparatus 100, 200 along the scan direction 130.

In an embodiment, in step 1108 the optical detector 106 detects the second optical signal 123 that is fluoresced by the BFD 198 within the subject. In one embodiment, the BFD 198 emits the second optical signal 123 in step 1108 after the BFD 198 absorbed the first optical signal 122 that was generated in step 1106.

In an embodiment, in step 1110 the controller 101 transmits a signal to the non-visual feedback device based on the detection of the second optical signal 123 in step 1108. In an embodiment, the non-visual feedback device subsequently outputs non-visual feedback (e.g. audio, haptic feedback detected by the user, etc.). In an example embodiment, in step 1110 the optical detector 106 transmits a signal to the controller 101 after detecting the second optical signal 123 in step 1108. In this embodiment, the controller 101 then outputs a signal to the non-visual feedback device (e.g. audio speaker 150) to cause the non-visual feedback device to output non-visual feedback (e.g. audio that is heard by the user). In the absence of the second optical signal 123 being detected by the optical detector 106 in step 1108, no signal is received at the controller 101 from the optical detector 106 and thus the controller 101 does not transmit a signal to the non-visual feedback device to output non-visual feedback.

In some embodiments, the non-visual feedback device employs a binary mode to output non-visual feedback (e.g. outputs the non-visual feedback when the second optical signal 123 is detected, does not output the non-visual feedback in an absence of detection of the second optical signal 123). However, in other embodiments, the non-visual feedback device employs a non-binary mode where one or more parameters (e.g. an amplitude of the sound, a time duration between repeated sounds, etc.) of the non-visual feedback is varied based on one or more parameters of the second optical signal 123 (e.g. an amplitude) that indicates a variation in one or more parameters of the BFD (e.g. increasing proximity of the BFD to the apparatus 100, increasing density of the BFD, increasing size of the BFD as the apparatus 100 approaches the BFD, etc.). In an example embodiment, prior to using the apparatus, the apparatus is calibrated such that the non-visual feedback is configured to output a desired non-visual feedback (e.g. peak sound, peak number of sound signals per unit time, etc.) based on one or more parameters of the BFD (e.g. within a threshold separation from the apparatus).

In an embodiment, in step 1112 a region of tissue 190 is characterized corresponding to the location of the housing 102, 202 when the user detects the non-visual feedback in step 1110. In an example embodiment, in FIG. 1A in step 1112 the first region 194 is characterized after the user detects an audio signal from the audio speaker 150. In one embodiment, for detecting a structure that the surgeon wishes to avoid (e.g. ureter), the sound emitted by the non-visual feedback device will change (e.g. get louder) as the housing 102, 202 approaches the structure (e.g. ureter). In an example embodiment, the surgeon places the housing 102, 202 near a region of the anatomy (e.g. the left lower quadrant of the abdomen) where the structure (e.g. ureter) usually is located but at times it can be displaced due to disease processes (e.g. diverticulitis). As the surgeon dissects the surrounding tissue they want to avoid injuring the structure (e.g. the ureter) and so as the sound gets very loud the surgeon stops and carefully looks for the structure (e.g. ureter) to avoid it. Thus, in this embodiment, the anatomical feature identification process 103 is calibrated so that the non-visual feedback device outputs non-visual feedback (e.g. peak sound amplitude and/or peak number of sound signals per unit time) when a threshold distance is reached between the housing 102, 202 and the structure (e.g. BFD). In this embodiment, the surgeon can select the threshold distance which is stored in the memory of the controller 101 for the particular surgical procedure. The inventors of the present invention realized that this advantageously makes the surgery safer and also faster since the surgeon need not spend excessive time carefully dissecting away to avoid the structure. In this embodiment, the surgeon will use the housing 102, 202 and BFD to help in the dissection.

In another example embodiment, the housing 102, 202 is used to locate a structure (e.g. the parathyroid) during the neck dissection. In current methods, the surgeon has to visually identify the structure based on a size and characteristic (e.g. a 5 mm mass that looks like a fatty structure). However, this improved method employs the housing 102, 202 to reliably identify the structure (e.g. parathyroid) and leave it in place as the surgeon performs other dissection and avoids sacrificing the structure.

In addition to the embodiments of FIGS. 1A-1B, FIGS. 2A-2B and FIG. 11, that provide a hand-mounted surgical tool that identifies anatomical features of subject tissue and non-visual feedback to the user, the present invention also provides the embodiments of FIGS. 3A-3C, FIGS. 4A-4C and FIG. 12 that provide a hand-mounted surgical tool that is used to perform cutting and/or electro-cauterizing steps in various surgical procedures (e.g. open surgery).

Figure 3A:
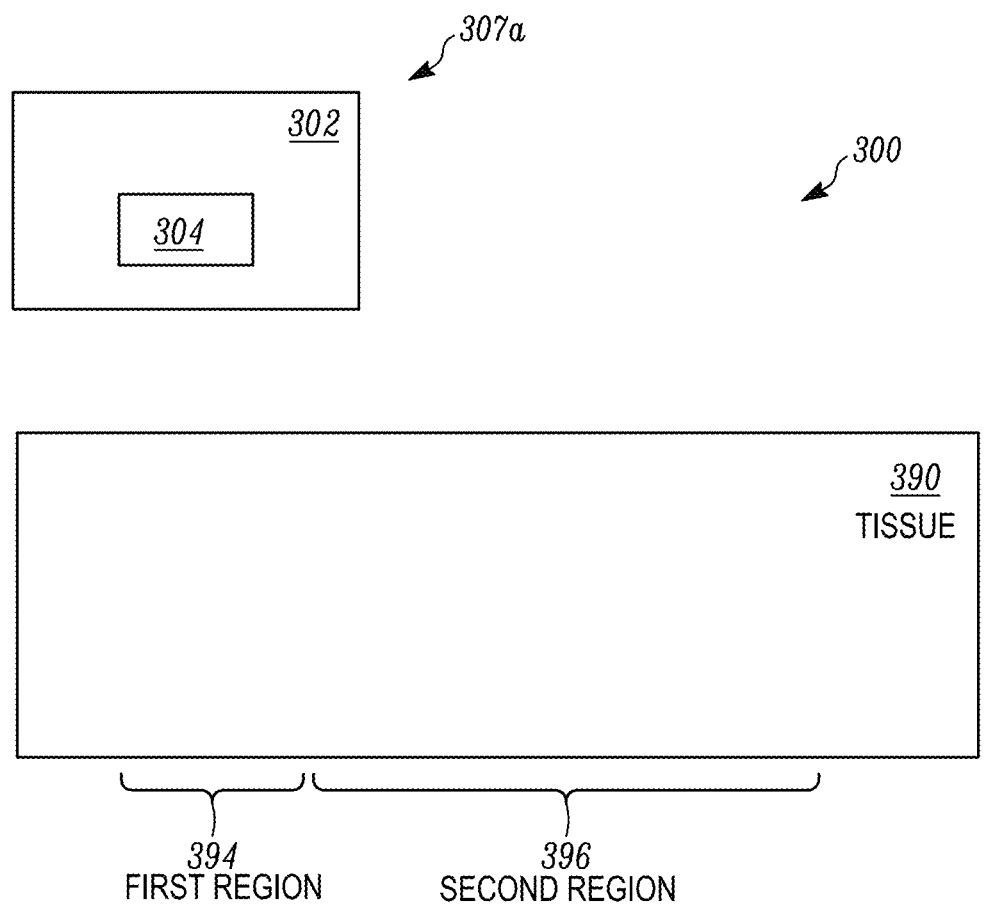
FIG. 3A is a schematic block diagram that illustrates an example of an apparatus providing a hand-mounted surgical tool in a first position, according to an embodiment.
Figure 3B:
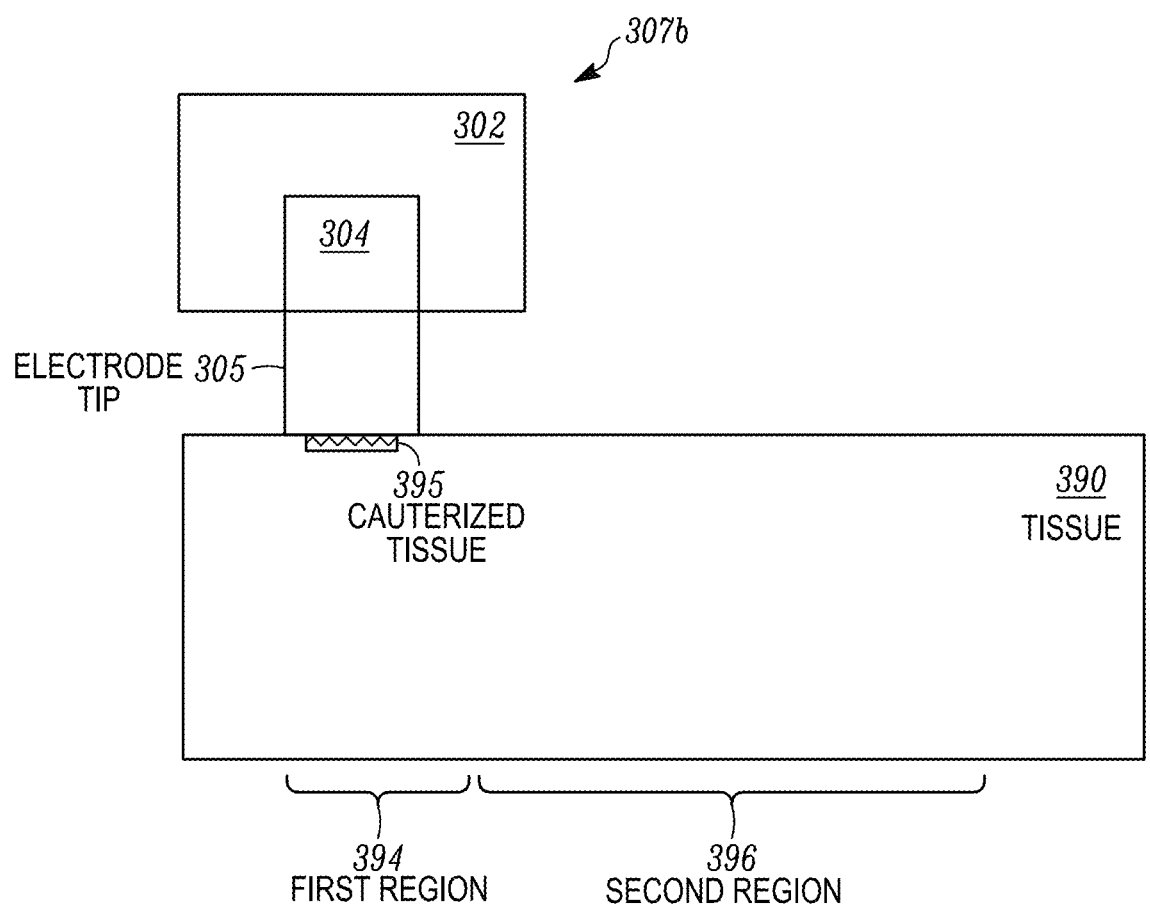
FIG. 3B is a schematic block diagram that illustrates the apparatus of FIG. 3A with the hand-mounted surgical tool in a second position, according to an embodiment.

FIGS. 3A and 3B are schematic block diagrams that illustrates an example of an apparatus 300 providing a hand-mounted surgical tool, according to an embodiment. In an embodiment, the apparatus 300 includes a housing 302 that defines one or more surfaces that are configured to be mounted to a body of a user (e.g. hand, finger, wrist, etc.). In one embodiment, the apparatus 300 includes an electrode 304 coupled to the housing 302 such that a tip 305 of the electrode 304 can be moved from a first position 307a (FIG. 3A) relative to the housing 302 to a second position 307b (FIG. 3B) relative to the housing 302. In one embodiment, the tip 305 moves from the first position 307a within the housing 302 to the second position outside the housing 302. Although FIGS. 3A and 3B depict the electrode 304 moving from the first position 307a within the housing 302 to the second position 307b outside of the housing 302, in other embodiments a device (e.g. electrocautery pen) with a device housing is mounted to the external surface of the housing 302. In this example embodiment, the electrode 304 moves from the first position within the device housing to the second position outside the device housing.

In an embodiment, the apparatus 300 is used to cut and/or cauterize (e.g. electrocauterize) tissue 390 of the subject. In an example embodiment, FIG. 3B depicts cauterized tissue 395 using the apparatus 300 (e.g. using the electrode tip 305 after electrical power is delivered to the electrode tip 305).

Figure 3C:
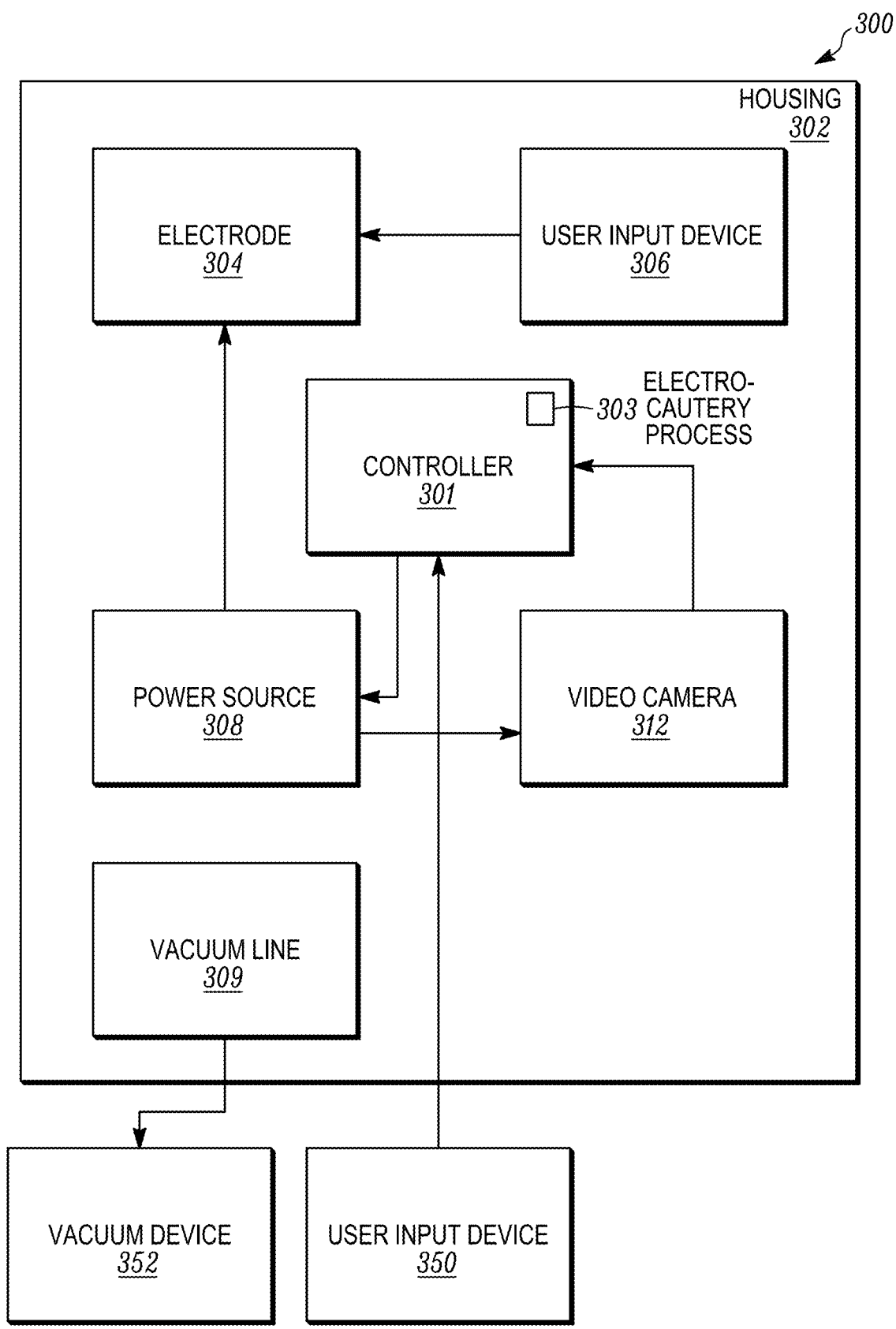
FIG. 3C is a block diagram of the apparatus of FIG. 3A, according to an embodiment.

FIG. 3C is a block diagram of the apparatus 300 of FIG. 3A, according to an embodiment. In an embodiment, the apparatus 300 includes a power source 308 (e.g. battery) electrically connected to the electrode 304. Although FIG. 3C depicts the power source 308 within the housing 302, in other embodiments the power source is external to the housing 302.

In an embodiment, the apparatus 300 also includes a controller 301 that is communicatively coupled with the power source 308. The controller 101 includes an electrocautery or cutting process 303 to cause the apparatus 300 to perform one or more steps of a method described below with reference to FIG. 12. In various embodiments, the controller 301 comprises one or more general purpose computer systems or upgraded computer systems that include graphics processing units, as depicted in FIG. 13 or one or more chip sets as depicted in FIG. 14 or one or more mobile stations 1501 as depicted in FIG. 15, and instructions to cause the computer or chip set or mobile station to perform one or more steps of a method described below with reference to FIG. 12.

In an embodiment, the apparatus 300 also includes a user input device 306 (e.g. button on an exterior surface of the housing 302). In an embodiment, the user input device 306 is operatively coupled to the electrode 304 such that applying input (e.g. pressing a button, turning a switch, etc.) to the user input device 306 causes the electrode tip 305 to move from the first position 307a within the housing 302 (FIG. 3A) to the second position 307b outside the housing 302 (FIG. 3B). In an example embodiment, the user input device 306 is used to move the electrode tip 305 to the second position 307b outside of the housing 302 for purposes of performing a cutting and/or electro-cauterizing step during a surgical procedure (e.g. open surgery).

In an embodiment, after the user input device 306 is used to mechanically move the electrode tip 305 to the second position 307b, another user input device 350 is provided to electrically activate the electrode tip 305 (e.g. for purposes of performing the cutting and/or electro-cauterizing step). In an embodiment, the user input device 350 (e.g. foot pedal) is outside of the housing 302 and is communicatively coupled to the controller 301. In an example embodiment, after the electrode tip 305 is in the second position 307b, the user actuates the user input device 350 (e.g. presses the foot pedal) to electrically activate the electrode tip 305 and commence the cutting and/or electro-cauterizing step. In an example embodiment, upon actuation of the user input device 350, a signal is transmitted from the user input device 350 to the controller 301. Upon detecting the signal from the user input device 350, the controller 301 transmits a signal to the power source 308 to cause the power source 308 to deliver electrical power to the electrode 304 (and tip 305).

In an embodiment, the apparatus 300 also includes a vacuum line 309 that is positioned within or in flow communication with an opening defined by the housing 302. In an embodiment, an inlet of the vacuum line 309 is positioned adjacent to the electrode tip 305 in the second position (FIG. 3B) and an outlet of the vacuum line 309 is connected with a vacuum device 352. In an example embodiment, during the cutting and/or electro-cauterizing step, the vacuum device 352 is activated. Undesirable vapors are removed from a site of the cutting and/or electrocauterizing step, by being drawn into the inlet of the vacuum line 309 and out of the outlet of the vacuum line 309 and into the vacuum device 352. This advantageously removes undesirable vapors in the vicinity of the cutting and/or electrocauterizing step.

In an embodiment, the apparatus 300 also includes a video camera 312 positioned within the housing 302 and electrically connected to the power source 308. In one embodiment, the video camera 312 is communicatively coupled to the controller 301. In an example embodiment, upon detecting the signal from the user input device 350, the controller 301 transmits the signal to the power source 308 to cause the power source 308 to deliver electrical power to both the electrode 304 and the video camera 312, so that the video camera 312 commences to record image data in a vicinity of the cutting and/or electrocauterizing step. In an example embodiment, the video camera 312 transmits signals to the controller 301 that indicate image data recorded by the video camera 312. In an example embodiment, the controller 301 can either store the image data or transmit a signal to a display to output the received image data.

Figure 4A:
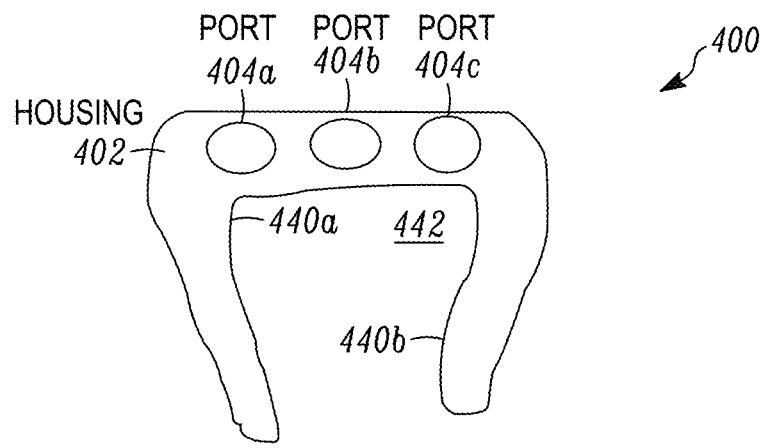
FIG. 4A is a schematic diagram that illustrates an example of a cross-sectional side view of the apparatus of FIG. 3A providing a finger-mounted surgical tool, according to an embodiment.

FIG. 4A is a schematic diagram that illustrates an example of a cross-sectional side view of the apparatus 400 providing a hand-mounted surgical tool, according to an embodiment.

In an embodiment, the apparatus 400 is similar to the apparatus 300 with the exception of the features discussed herein. In another embodiment, the apparatus 400 includes a housing 402 that is similar to the housing 202 of FIG. 2A with the exception of the features discussed herein. In an example embodiment, the housing 402 includes an opening 442 and surfaces 440a, 440b that are similar to the opening 242 and surfaces 240a, 240b of the housing 202. In an example embodiment, the housing 402 has one or more dimensions that are similar to the dimensions of the housing 202. In some embodiments, the housing 402 defines the opening 442 and surfaces 440a, 440b that are sized and configured to receive the wrist or finger 250 of the user. In other embodiments, the housing 402 defines the opening 442 and surfaces 440a, 440b that are sized and configured to receive the wrist of the user. In some embodiments, multiple housings 402 are provided including a first housing 402 that is sized to receive the finger 250 of the user and a second housing 402 that is sized to receive the wrist of the user.

In an embodiment, the housing 402 defines one or more ports that are configured to receive one or more components of the apparatus 400. In an example embodiment, the housing 402 defines a plurality of ports 404a, 404b, 404c. In an example embodiment, an inner diameter of the ports 404 is about 5 mm or in a range from about 1 mm to about 10 mm. In another example embodiment, the housing 402 is made from one or more of Computer Numerical Control (CNC) machined metal or injected molded high-density polymer material or 3D-printed high-density polymer material. In an example embodiment, where a first housing 402 is sized to receive the finger 250 of the user and a second housing 402 is sized to receive the wrist of the user, multiple ports 404 are provided in each of the first and second housing such that components of the apparatus 400 can be received through the ports 404 in both housings 402 (e.g. a vacuum line 309 passes through ports 404 in both the first housing 402 mounted to the finger and the second housing 402 mounted to the wrist).

Figure 4B:
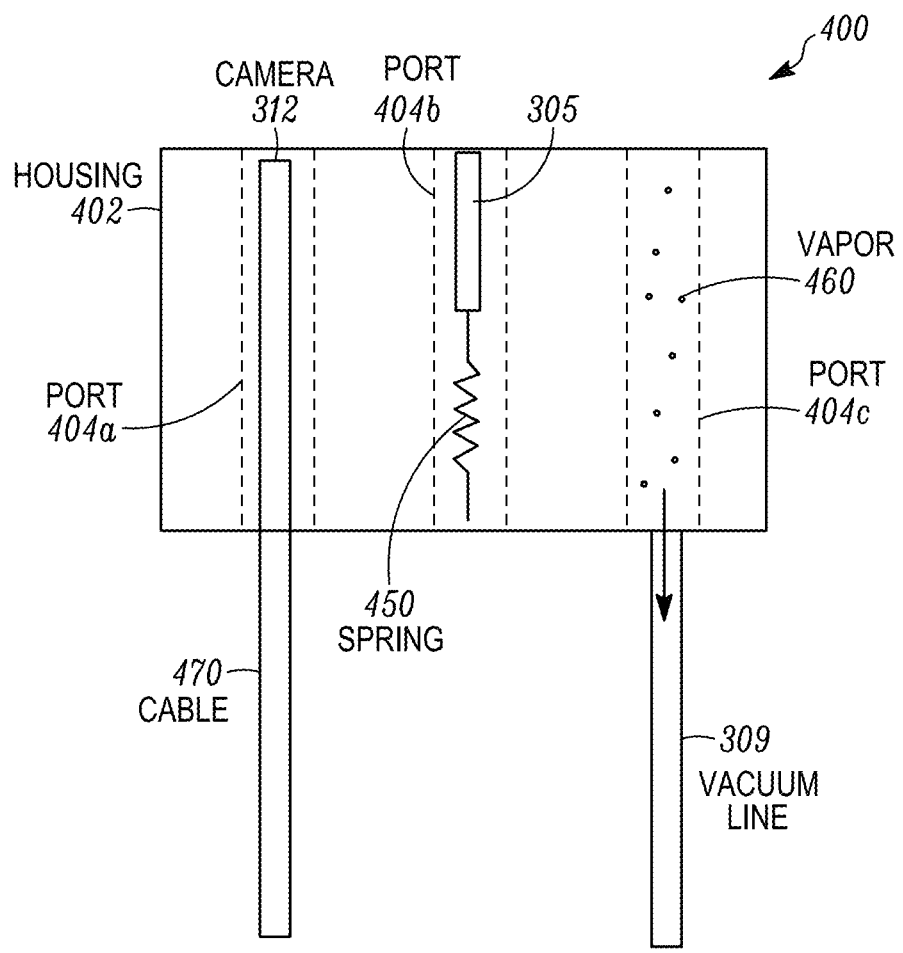
FIG. 4B is a schematic diagram that illustrates an example of a cross-sectional top view of the apparatus of FIG. 4A, according to an embodiment.

FIG. 4B is a schematic diagram that illustrates an example of a cross-sectional top view of the apparatus 400 of FIG. 4A, according to an embodiment. In an embodiment, the video camera 312 is received within a first port 404a of the housing 402. In an example embodiment, the video camera 312 is positioned within the first port 404a such that a lens of the camera is aligned and/or adjacent with an end of the port 404a on a same side of the housing 402 from which the electrode tip 305 extends. In an example embodiment, an electrical cable 470 extending outside of the housing 402 to an external power source is connected to the video camera 312 to provide electrical power to the video camera 312. In another example embodiment, the video camera 312 is connected to the power source 308 within the housing 402 and thus the cable 470 is omitted. In an embodiment, the instruments (e.g. video camera 312, electrode tip 305 and spring 450) can be secured in the ports 404a, 404b using a gasket/interference fit or a secondary device (e.g. clip, set screw, mating system like a Luer lock, etc.).

In an embodiment, the electrode 304 is positioned within a second port 404b of the housing 402. In an example embodiment, the electrode 304 includes a spring 450 that is movably connected to the electrode tip 305. In an example embodiment, the spring 450 is mounted within the port 404b (e.g. to an end of the port 404b opposite to the side of the housing 402 where the tip 305 extends). In an example embodiment, the user input device 306 is operatively coupled to the spring 450 so to cause the spring 450 to move from a compressed position (FIG. 4B) where the tip 305 is within the housing 402 to an extended position (not shown) where the tip 305 extends beyond the housing 402. In one example embodiment, the user input device 306 is one of a switch and a button on an exterior surface of the housing 302.

In an embodiment, the vacuum line 309 is in flow communication with and/or is received within a third port 404c of the housing 402. In an embodiment, the vacuum line 309 extends beyond the third port 404c to establish flow communication between the third port 404c and the vacuum device 352. In an embodiment, during the cutting and/or electrocauterizing step, the vacuum device 352 is activated to cause undesirable vapors 460 to be removed from the cutting and/or electrocauterizing site.

Figure 4C:
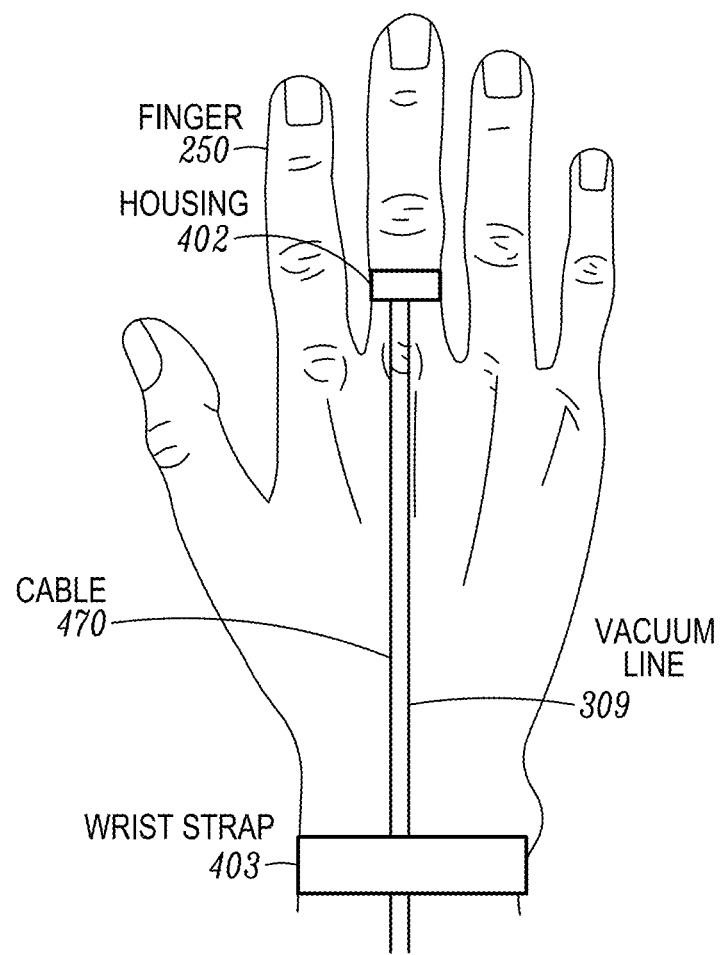
FIG. 4C is a schematic diagram that illustrates the apparatus of FIG. 4A mounted on a finger of a user, according to an embodiment.

FIG. 4C is a schematic diagram that illustrates the housing 402 of the apparatus 400 of FIG. 4A mounted on a finger 250 of a user, according to an embodiment. Although FIG. 4C depicts the housing 402 mounted to the middle finger 250 of the user, in other embodiments the housing 402 is mounted to any other finger or thumb of the body or any portion of the body (e.g. hand, wrist, etc.) of the user. In another embodiment, the apparatus 400 includes a wrist strap 403 to be worn around a wrist of the user and defining one or more openings or ports (not shown) to receive one or more of the cable 470 and the vacuum line 309.

Although various tools or components of the apparatus are discussed as being received within the ports 404 of the housing 402, other tools or components can be utilized beyond those discussed above. For example, in addition to the vacuum line 309 (negative pressure line to protect the surgeon and staff from fumes or to suction gas or fluid) in other embodiments a positive pressure line can be utilized and passed through the port 404 (e.g. to blow inject/debride with gas or fluid). In yet another example, any tool can be passed through the port 404 that may go in an endoscope (e.g. tweezers, clamps, biopsy punch, etc.).

Figure 12:
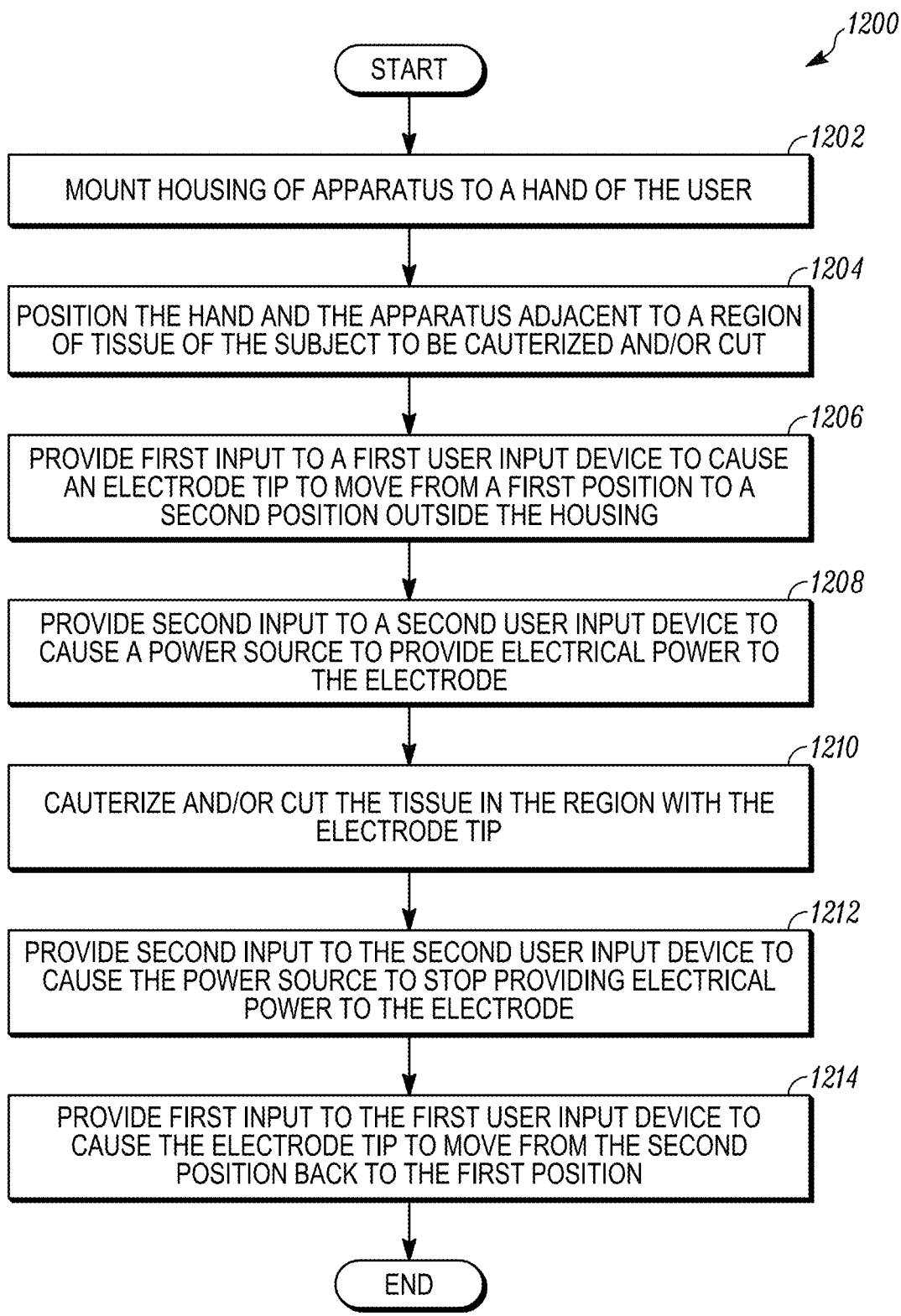
FIG. 12 is a flowchart that illustrates an example of a method for using the apparatus of FIG. 3A, according to an embodiment.

FIG. 12 is a flowchart that illustrates an example of a method 1200 for using the apparatus of FIG. 3A, according to an embodiment. In an embodiment, step 1202 is similar to step 502 of the method 500.

In step 1204, the hand (and mounted apparatus 300, 400) is positioned adjacent to a region of tissue 190 (e.g. region 394 in FIG. 3A) to be cauterized and/or cut. In one embodiment, for rectal dissection, the surgeon is dissecting the posterior rectal wall away from the sacrum. With conventional surgical methods, this dissection has limited visualization especially when it is deep in a narrow pelvis and when it is blocked by a large tumor. For these conventional surgical methods, during these times the surgeon sometimes has to employ blunt dissection using finger fracture which prevents sharp dissection and causes excess bleeding. The inventors of the present invention recognized that if cautery is available at the finger-tip, dissection can be performed more accurately and with less blood. Current cautery systems do not allow visualization and cautery at the same time. Thus, finger-tip cautery will allow the surgeon to reach these hard to get places safely. The inventors recognized that one advantage of the apparatus 300, 400 is that it can be maneuvered into small areas that cannot be reached by conventional surgical tools (e.g. pelvis area).

In step 1206, the user provides input to the user input device 306 to cause the electrode tip 305 to move from the first position 307a relative to the housing 302 (e.g. within the housing, as shown in FIG. 3A) to the second position 307b relative to the housing 302 (e.g. outside the housing, as shown in FIG. 3B). In an example embodiment, in step 1206 the user presses a button or moves a switch that is provided on an external surface of the housing 302. In yet another embodiment, in step 1206 a signal is provided by the user from an external device (e.g. mobile phone, etc.).

In step 1208, after the electrode tip 305 is moved to the second position 307b (FIG. 3B), the user provides input to the user input device 350 to cause the power source 308 to provide electrical power to the electrode 304. In an example embodiment, in step 1208 the user presses a foot pedal after which the foot pedal (user input device 350) transmits a signal to the controller 301. Upon receiving the signal from the user input device 350, the controller 301 transmits a signal to the power source 308 to cause the power source 308 to deliver electrical power to the electrode 304. In an example embodiment, the electrode tip 305 in the second position 307b is electrically activated based on step 1208. The inventors noted that one advantage of step 1208 is that the user (e.g. surgeon) need not move their hands from the surgical site in order to activate the electrode tip. In some embodiments, steps 1206 and 1208 are combined into one step (e.g. where actuation of the user input device 350, such as the foot pedal, causes the electrode tip 305 to move to the second position 307b and to electrically activate the tip 305).

In step 1210, after the electrode tip 305 is electrically activated in step 1208, the user cauterizes and/or cuts the tissue 190 in the region of interest (e.g. region 394 in FIG. 3A). In an example embodiment, step 1210 continues until the tissue at the region 394 is cauterized and/or cut. In an example embodiment, the tissue at the region 394 is cut and/or cauterized over a few seconds at a time. In this example embodiment, the electrode tip 305 is not heated for a long time. In this example embodiment, the surgeon controls the duration of heating the electrode tip 305 and/or the cutting/cauterizing to achieve the desired effect on the tissue.

In step 1212, after the tissue in the region 394 is cauterized and/or cut, the user deactivates the electrode tip 305 by providing input (e.g. depressing the foot pedal) to the user input device 350 (e.g. foot pedal). In an example embodiment, upon providing input to the user input device 350 in step 1212, the user input device 350 transmits a signal to the controller 301 and the controller 301 subsequently transmits a signal to the power source 308 to cease delivery of electrical power to the electrode 304.

Similarly, after the electrode tip 305 is deactivated in step 1212, in step 1214 the electrode tip 305 is moved back from the second position 307b outside the housing 302 (FIG. 3B) to the first position 307a within the housing 302 (FIG. 3A). In an example embodiment in step 1214 the user provides input (e.g. presses a button, moves a switch) to the user input device 306 that is operatively coupled to the electrode 304 and causes the electrode tip 305 to move from the second position 307b back to the first position 307a.

Example Embodiments

In these example embodiments, the housings 102, 202, 302, 402 feature a connector design where the housing defines one or more slots in which one or more removable and interchangeable attachments can be received. The removable attachment can define one or more slots, ports or openings (e.g. similar to the ports 404a, 404b, 404c) which can be used to position various components of the apparatus (e.g. camera cable 470, vacuum line 309, electrode 304, electrical cables to the electrode 304 or optical source 104 or optical detector 106, etc.). In these example embodiments, multiple interchangeable attachments are provided each with a specific arrangement of slots, ports or openings and where each interchangeable attachment can be slidably received within the housing slot. The inventors of the present invention recognized that this modular (plug and play) design is particularly advantageous, as it enhances the flexibility of the apparatus so that the surgeon can freely select one of the multiple attachments in each slot of the housing, based on the particular surgery being performed. Additionally, in these example embodiments, multiple housings are provided where a first housing is mounted to the hand (e.g. finger or knuckle) and a second housing is mounted to the wrist and where the removable attachments can be removably attached to either the first or second housing and/or can be interchanged between the first or second housing.

The embodiments of the present invention are not limited to the dimensional scale of the components depicted in FIGS. 5-10. In other embodiments, smaller form factors of the apparatus components can be utilized. FIGS. 5A through 5D are images that illustrate an example of various housings providing a finger or wrist mounted surgical tool for the apparatus of FIG. 2A or FIG. 3A, according to an embodiment. In this embodiment, the apparatus 500 includes a housing 502 that is similar to the housing 402, except that the ports 404a, 404b, 404c are formed in the attachment 511 that is removably attached to the housing 502. As shown in FIG. 5A, the housing 502 defines a slot 501 (e.g. T-shaped slot) and a second housing (e.g. wrist strap 503) also defines the slot 501 (e.g. T-shaped slot). In an example embodiment, the wrist strap 503 is similar to the wrist strap 403 of FIG. 4C that forms one or more slots or openings to receive components (e.g. cable 470, vacuum line 309, etc.) of the apparatus.

In this embodiment of the apparatus 500, the attachment 511 is selected and is positioned within the slot 501 of the housing 502 and the attachment 512 is selected and is positioned within the slot 501 of the wrist strap 503. In addition to the attachment 512, in one embodiment a second attachment 514 is positioned within a second slot 501 of the wrist strap 503. In an example embodiment, the attachments 511, 512, 514 include an extension (e.g. T-shaped extension 710 as shown in FIG. 7D) that is sized to be slidably received within the slot 501. In this example embodiment, the extension is sized such that the extension frictionally engages the interior surfaces of the slot 501 so that the attachment is removably secured within the slot 501.

Figures 5A, 5B:
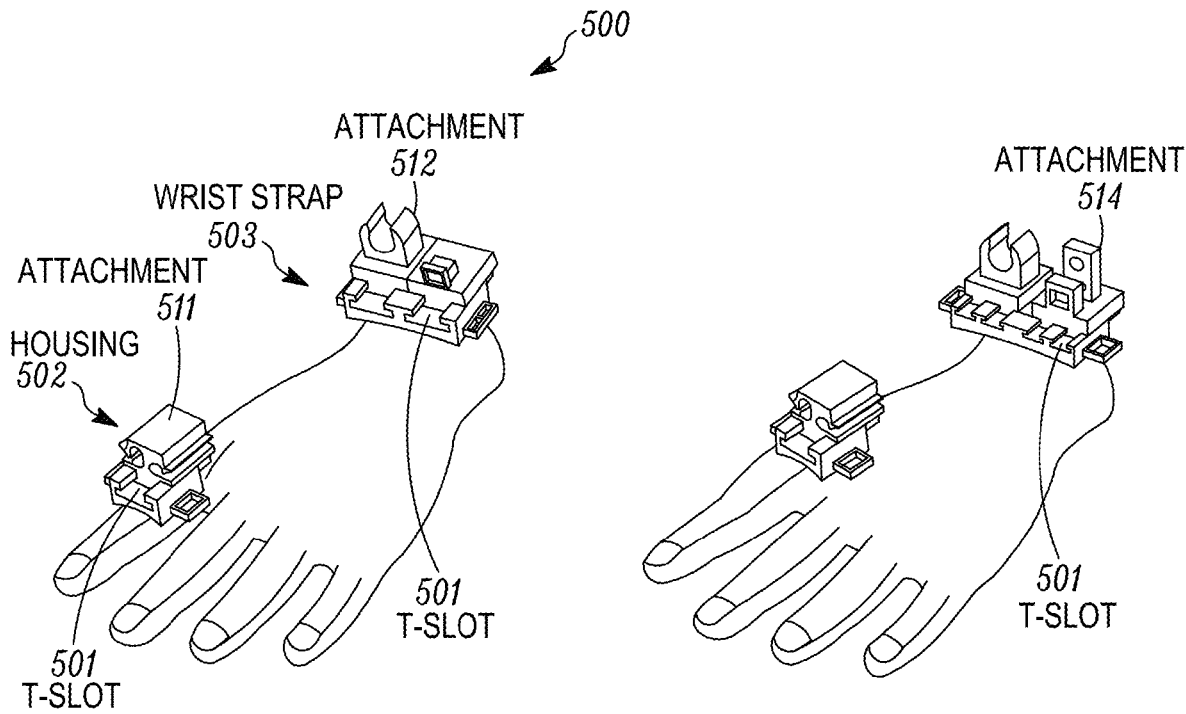
FIGS. 5A through 5D are images that illustrate an example of various housings providing a finger or wrist mounted surgical tool for the apparatus of FIG. 2A or FIG. 3A, according to an embodiment.
Figure 5C:
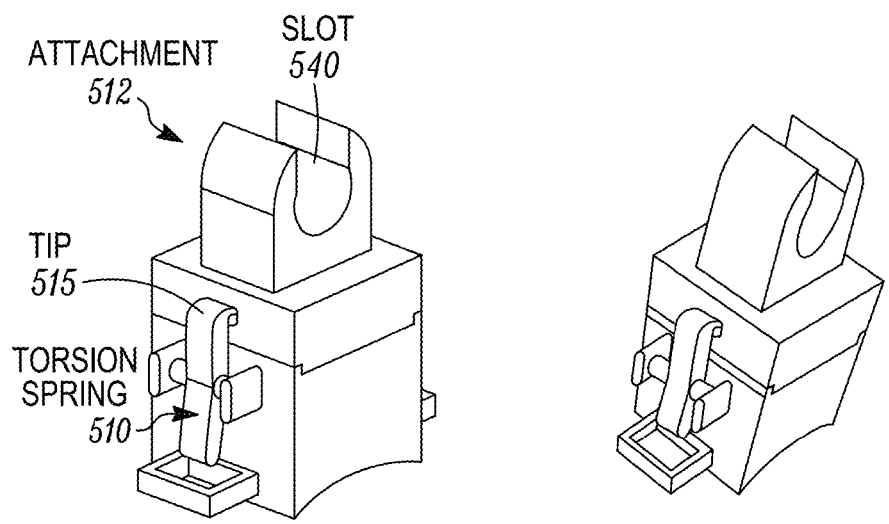

In an embodiment, FIG. 5C depicts the attachment 512 that is slidably received within the slot 501 of the wrist strap 503. In one embodiment, the attachment 512 defines a slot 540. In an example embodiment, the slot 540 is sized to receive one or more components of the apparatus (e.g. the cable 470 or the vacuum line 309 as shown in FIG. 4C, electrical cables to provide power to the optical source 104 or optical detector 106, electrical cables to provide power to the electrode 304, etc.). In another embodiment, the attachment 512 includes a torsion spring 510 that can be moved from a first position (as shown in FIG. 5C) to a second position where the tip 515 moves away from the side of the attachment 512. When the tip 515 is moved to the second position, one or more components of the apparatus (e.g. the cable 470 or the vacuum line 309 or electrical cables to provide power to one or more of the optical source 104, optical detector 106 and electrode 304) can be positioned between the tip 515 and the side of the attachment 512 before the torsion spring 510 is released, causing the tip 515 to move back to the position as shown in FIG. 5C and secure the components against the attachment 512.

Figure 5D:
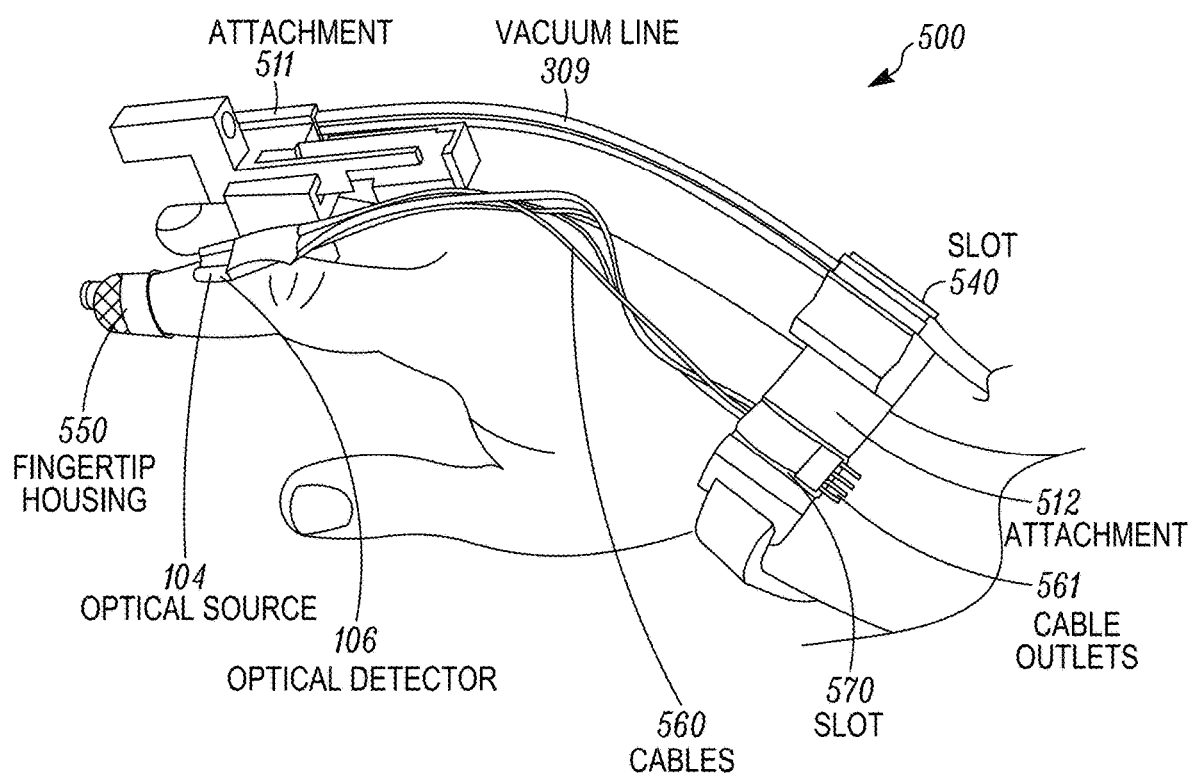

In an embodiment, FIG. 5D depicts the apparatus 500 with the attachment 511 that is slidably received within the slot 501 of the finger mounted housing 502. In one embodiment, the attachment 511 defines a slot or opening (not shown) to receive the vacuum line 309. In another embodiment, the attachment 512 received within the slot 501 of the wrist strap 503 includes the slot 540 that receives the vacuum line 309. Thus, in this embodiment, both a finger mounted housing 502 and a wrist strap 503 each define a slot to receive the vacuum line 309.

In an embodiment, FIG. 5D also includes a fingertip housing 550 that is sized to enclose the fingertip. In an example embodiment, the fingertip housing 550 is shaped like a thimble (e.g. closed at one end, open at the opposite end and/or with an inner dimension that is tapered based on the natural tapering of the fingertip). In one embodiment, the optical source 104 and the optical detector 106 are mounted to the fingertip housing 550 (FIG. 5D depicts the optical source 104 and optical detector 106 prior to mounting to the fingertip housing 550). In one embodiments, electrical cables 560 that supply the optical source 104 and optical detector 106 with power are received within a slot 570 formed in the wrist strap 503. In an example embodiment, outlets 561 of the electrical cables 560 are communicatively coupled with the controller 101 (not shown). Thus, in an example embodiment, the apparatus 500 of FIG. 5D embodies the apparatus of FIG. 2A (e.g. optical source 104 and optical detector 106 mounted to the fingertip housing 550) and FIG. 2B (e.g. vacuum line 309 and electrode (not shown) mounted to the finger mounted housing 502 via. the attachments 511, 512.

Figure 6A:
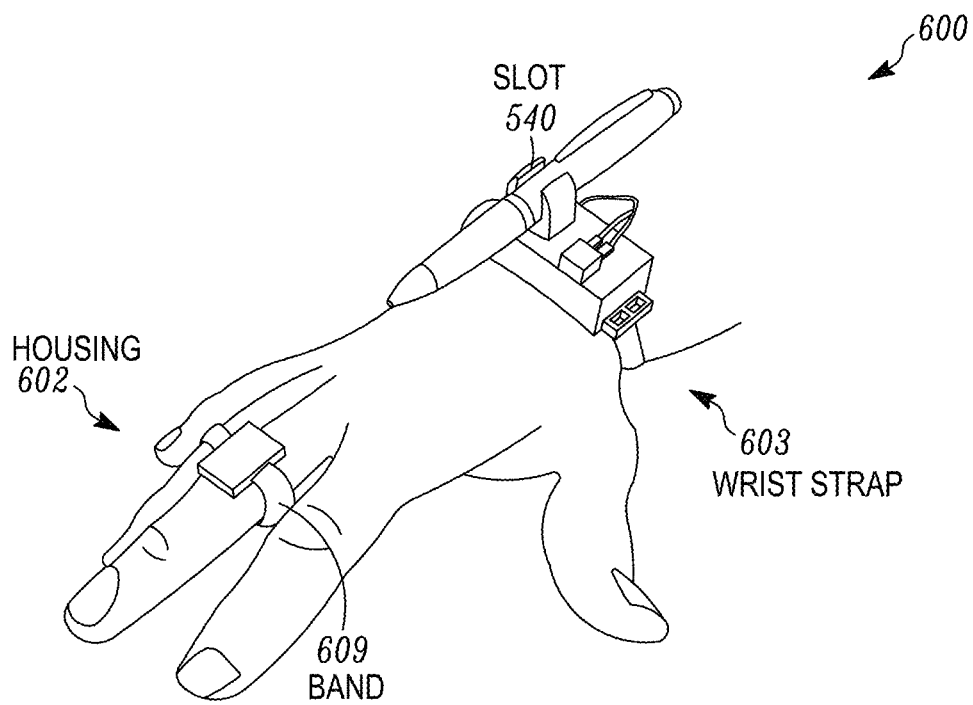
FIGS. 6A and 6B are images that illustrate an example of various housings providing a finger or wrist mounted surgical tool for the apparatus of FIG. 2A or FIG. 3A, according to an embodiment.
Figure 6B:
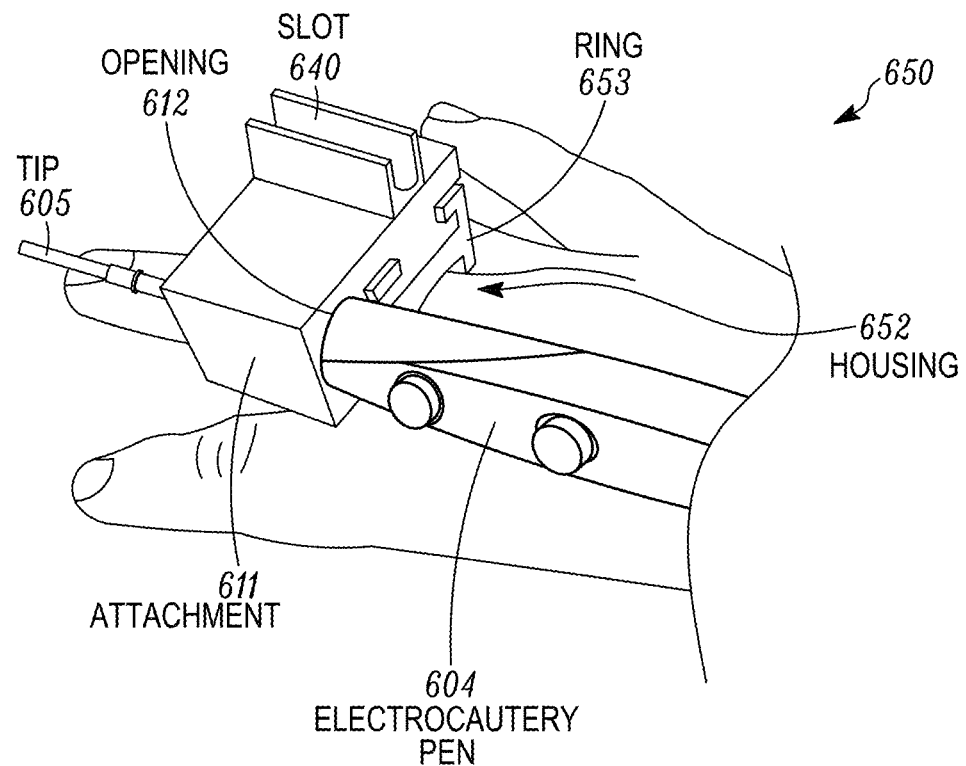

FIGS. 6A and 6B are images that illustrate an example of various housings providing a finger or wrist mounted surgical tool for the apparatus of FIG. 2A or FIG. 3A, according to an embodiment. In an embodiment, the apparatus 600 of FIG. 6A includes a wrist strap 603 that is similar to the wrist strap 503 of FIGS. 5A-5D. The slot 540 is sized to receive the component of the apparatus (e.g. vacuum line 309; FIG. 6A shows a pen received within the slot 540 for purposes of illustration). The apparatus 600 also includes the housing 602 that is similar to the housing 402 except features a band 609 that encircles the full circumference of the finger (e.g. secured around the finger using a fastener, such as Velcro®, elastic, ratchet strap with release, snaps such as those used with baseball caps, a spiral or any other stretchy macro pattern). The inventors of the present invention recognized that the band 609 provides enhanced security and stability of the finger mounted housing 602.

In an embodiment, the apparatus 650 of FIG. 6B includes a housing 652 with a finger mounted ring 653 and an attachment 611 slidably received within a slot 501 (e.g. T-shaped) of the finger mounted ring 653. In one embodiment, the finger mounted ring 653 is similar to the housing 402. As shown in FIG. 6B, the attachment 611 defines an opening 612 that is sized and configured to receive an electrocautery pen 604 (e.g. an existing off the shelf electrocautery pen) such that the tip 605 extends beyond the housing 652 and attachment 611 and can be used during surgery. In one embodiment, the electrocautery pen 604 is activated using the user input device 350 (e.g. foot pedal). Additionally, in one embodiment the attachment 611 further includes a slot 640 that is sized to receive the vacuum line 309. The inventors of the present invention recognized that the apparatus 650 and the attachment 611 is particularly advantageous, as it permits an existing off-the-shelf electrocautery pen 604 to be used in performing the method 1200 of FIG. 12.

FIGS. 7A through 7F are images that illustrates an example of various housings and attachments providing a finger and wrist mounted surgical tool for the apparatus of FIG. 2A or FIG. 3A, according to an embodiment. In an example embodiment, the apparatus 700 of FIG. 7A shows the attachment 611 of FIG. 6B mounted to the ring 653 and including the slot 640 that is used to receive the vacuum line 309. Additionally, the apparatus 700 includes the wrist strap 503 and attachment 512 of FIG. 5D with the slot 540 that also receives the vacuum line 309.

FIGS. 7C through 7F depict various interchangeable attachments that can be used and secured within the slot 501 of the finger mounted housing or the wrist strap. In an example embodiment, FIG. 7C shows slots 501 in the ring 653 and multiple attachments slidably received within the slots 501. FIGS. 7D through 7F depict an embodiment of other interchangeable attachments 511, 512, 711 that can be received within the slot 501. The embodiments of the present invention are not limited to the attachments depicted in FIGS. 7B through 7D and include any attachment with the extension 710 (e.g. T-shaped extension) that is sized to be slidably received within the slot 501 and features one or more openings or slots to receive components of the apparatus (e.g. vacuum line 309, cable 470, etc.). In an example embodiment, the attachment 711 of FIG. 7F includes multiple slots 712, 713, 714 of varying dimension/shape which are conveniently provided to pass through different sized components (e.g. power cords, data lines, vacuum line 309, etc.) of the apparatus when performing the method 1100 of FIG. 11 or the method 1200 of FIG. 12.

FIGS. 8A through 8D are images that illustrates an example of a housing 802 providing a finger mounted surgical tool for the apparatus of FIG. 3A, according to an embodiment. The housing 802 includes a ring 652 that is secured around the finger with the band 609. In an embodiment, an attachment 812 is slidably received within the slot 501 of the ring 652. In one embodiment, the attachment 812 defines an elongated opening 813 (FIG. 8B) sized to receive the electrocautery pen 804. In an example embodiment, the elongated opening 813 is similar to the port 404b of FIGS. 4A and 4B.

Figure 8A:
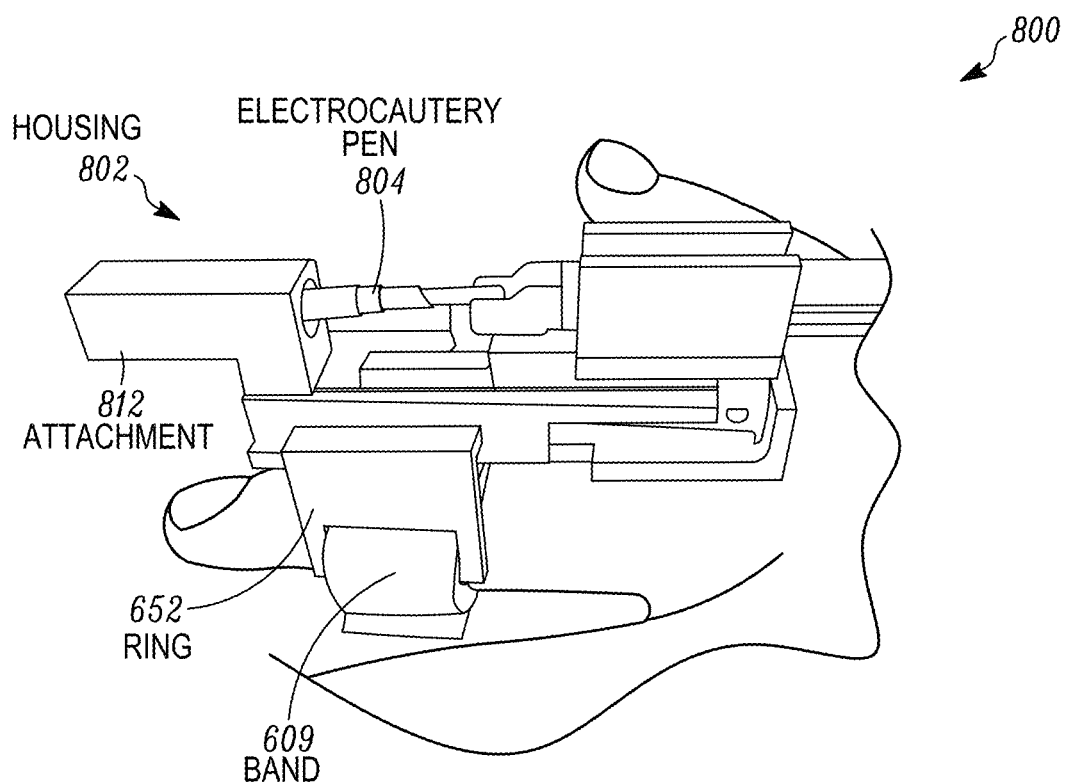
FIGS. 8A through 8D are images that illustrates an example of a housing providing a finger mounted surgical tool for the apparatus of FIG. 3A, according to an embodiment.
Figure 8B:
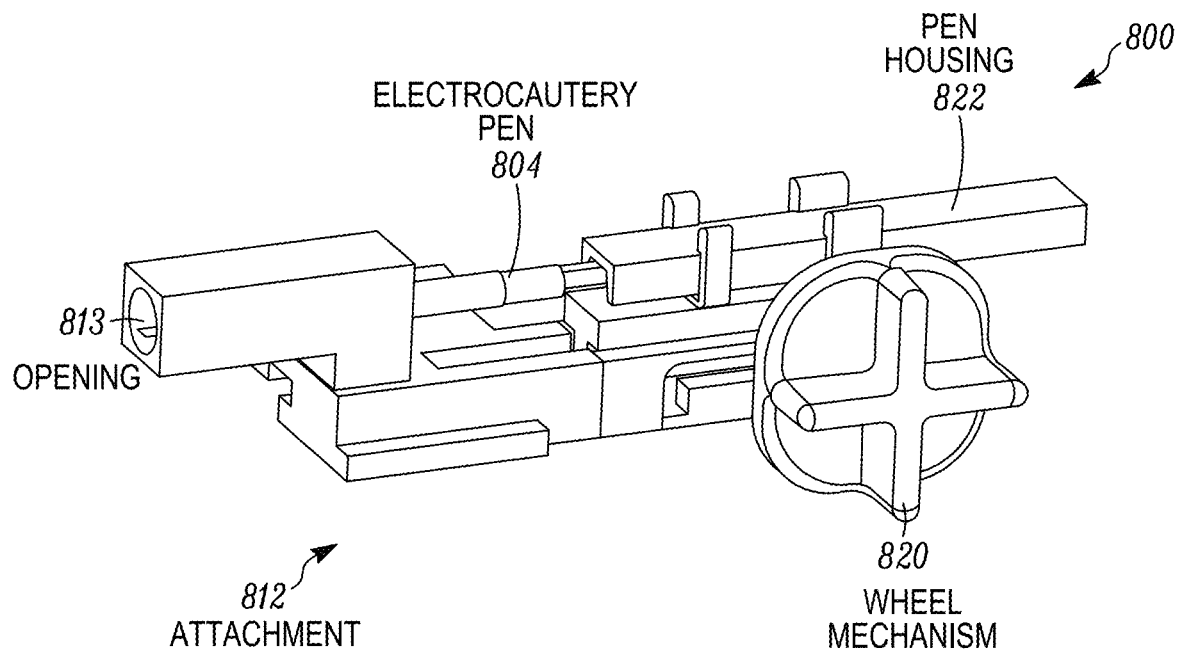
Figure 8C:
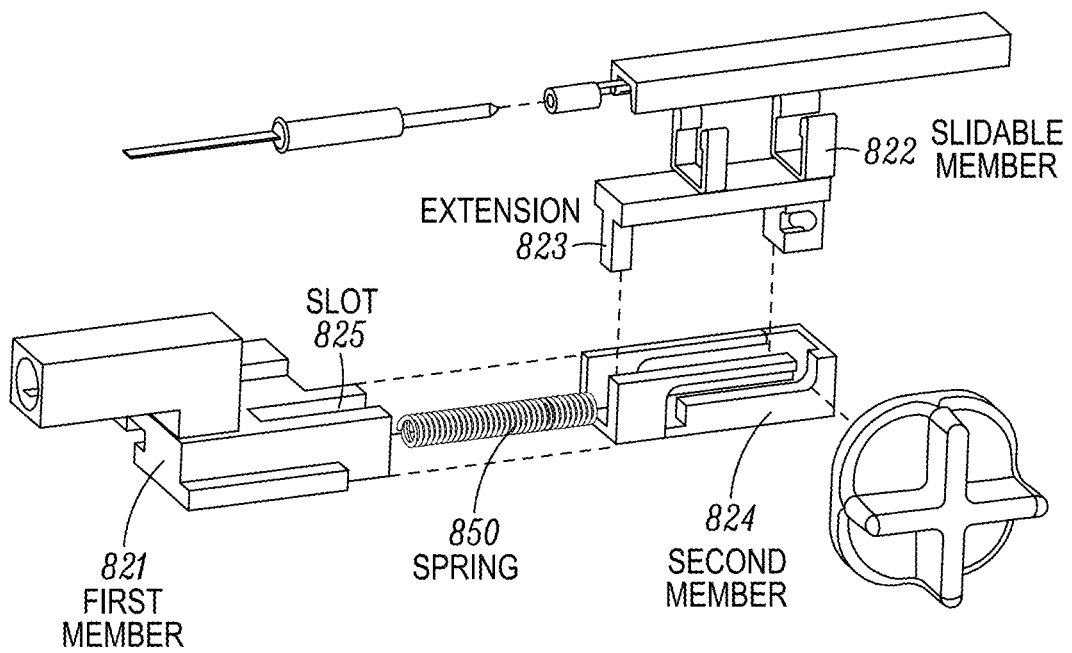
Figure 8D:
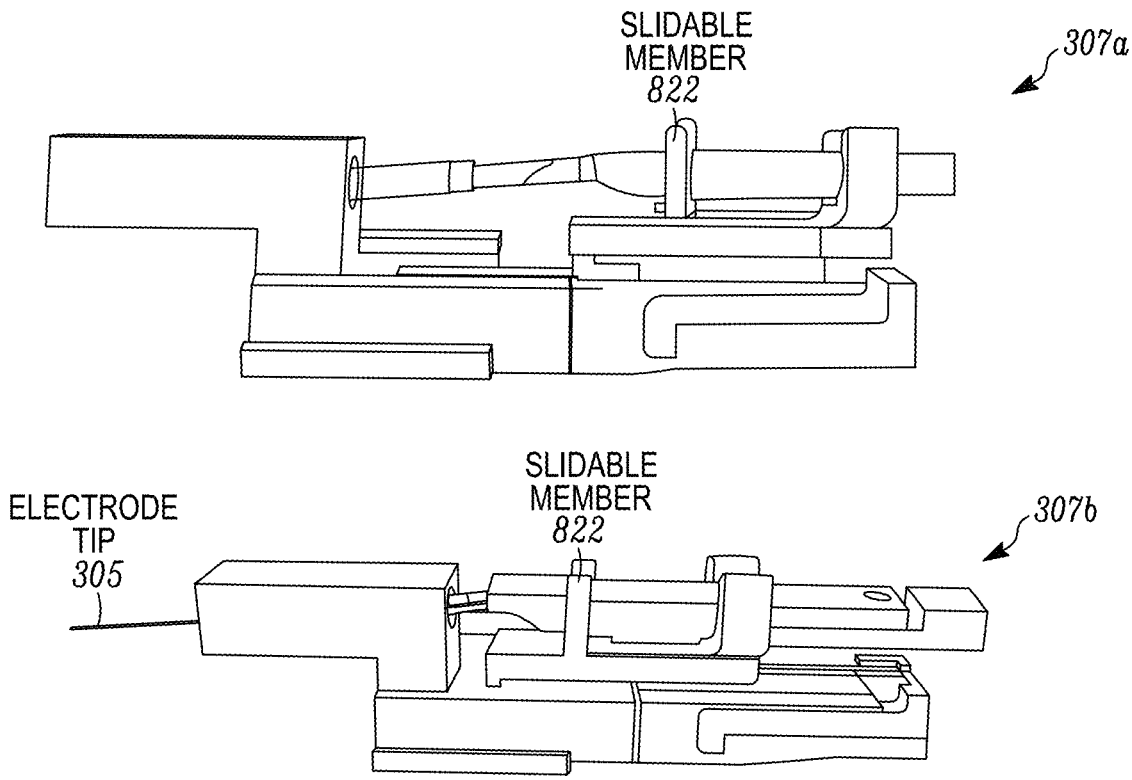

In an embodiment, as shown in FIG. 8B a wheel mechanism 820 is provided that is similar to the user input device 306 configured to move the electrode 304 from a first position 307a (e.g. within the opening 813, see top of FIG. 8D) to a second position 307b (e.g. outside the opening 813, see bottom of FIG. 8D). In an embodiment, FIG. 8C depicts that the apparatus 800 includes a first member 821, a second member 824 and a slidable member 822 that is configured to slide relative to the first and second members 821, 822 based on a spring 850 that engages an extension 823 of the slidable member 822. Actuation of the wheel mechanism 820 causes the slidable member 822 (and the electrocautery pen 804 and housing 822 mounted to the slidable member 822) to move relative to the first and second members 821, 822 such that the tip 305 moves from the first position 307a within the opening 813 (top of FIG. 8D) to the second position 307b outside the opening 813 (bottom of FIG. 8D). Although the wheel mechanism 820 is depicted in FIGS. 8A through 8D, in other embodiments any user input device 306 can be used to move the electrode tip 305 from the first position to the second position. In another embodiment, once the electrode tip 305 is moved to the second position, the user can actuate the user input device 350 (e.g. foot pedal) to activate the electrode tip 305.

Figure 9:
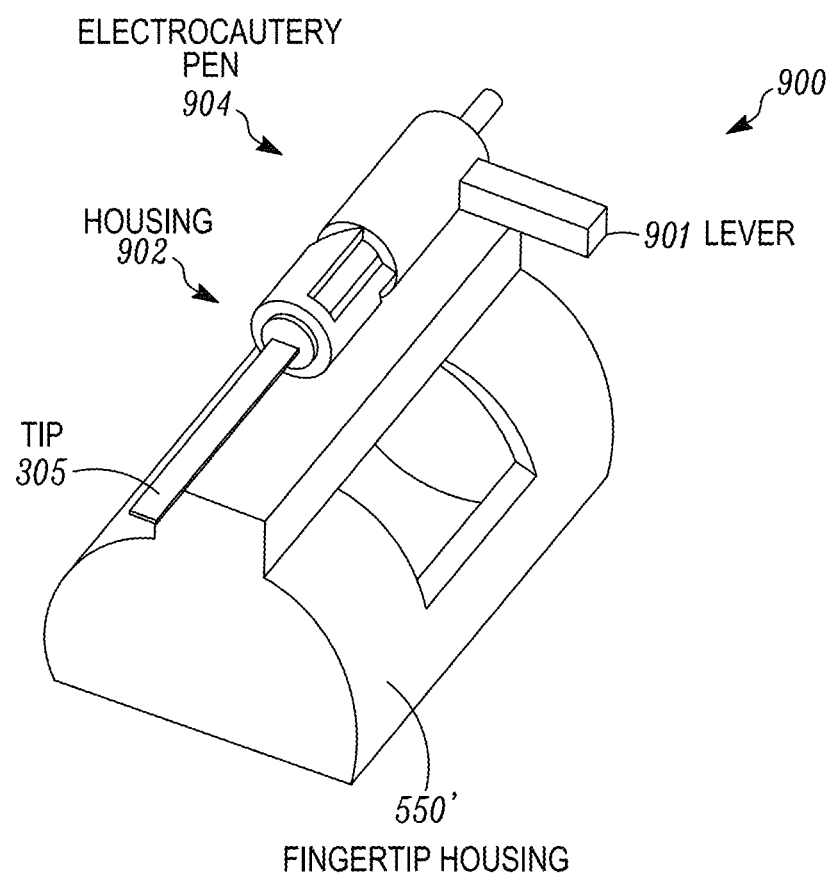
FIG. 9 is an image that illustrates an example of a housing providing a finger mounted surgical tool for the apparatus of FIG. 3A, according to an embodiment.

FIG. 9 is an image that illustrates an example of a housing 902 providing a finger mounted surgical tool for the apparatus of FIG. 3A, according to an embodiment. In an embodiment the housing 902 is a fingertip housing 550' similar to the fingertip housing 550 that is sized and configured to receive a fingertip of the user. In an example embodiment, the electrocautery pen 904 is mounted to the housing 550' (e.g. mounted to an external surface of the housing 550') and the electrocautery pen 904 features a lever 901 that acts as the user input device 306. In an embodiment, FIG. 9 depicts internal components of the electrocautery pen 904 and an outer sheath (not shown) encloses the internal components. In this embodiment, the outer sheath is mounted to the external surface of the housing 550'. Upon actuation (e.g. rotation) of the lever 901 the electrode tip 305 moves from a first position (e.g. within a housing of the pen 904) to a second position (e.g. outside the housing of the pen 904). The inventors of the present invention recognized that the apparatus 900 is particularly advantageous since it permits the surgeon to rotate the fingertip housing 500' to one of multiple orientations around the fingertip, depending on whether the surgeon prefers the electrode tip 305 to be above or below the finger during surgery. In an example embodiment, the fingertip housing 500' can be positioned in a first orientation around the fingertip (FIG. 9) such that the tip 305 is positioned above the fingertip. In another example embodiment, the fingertip housing 550' can be rotated about the fingertip such that the tip 305 is positioned below the fingertip during surgery. Additionally, the inventors of the present invention recognized that the lever 901 is particularly advantageous as it is located in a convenient location for the user to move the tip 305 to the second position, in a manner that is similar to the lever in a ball point design.

Figure 10:
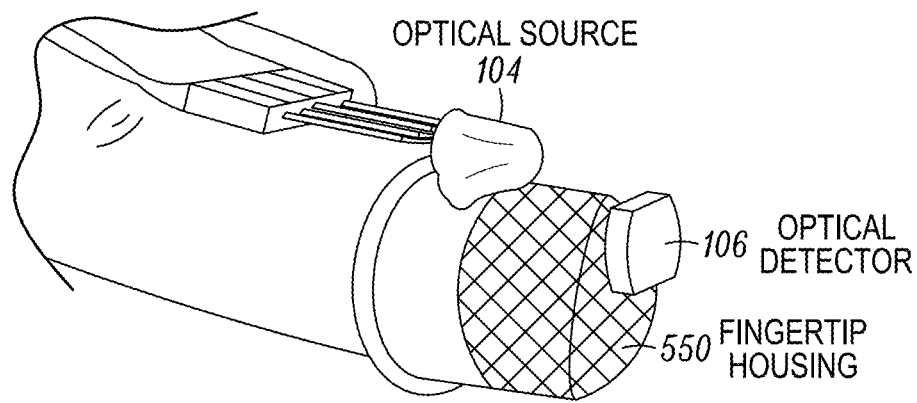
FIG. 10 is an image that illustrates an example of a housing providing a finger mounted surgical tool for the apparatus of FIG. 3A, according to an embodiment.

FIG. 10 is an image that illustrates an example of a housing 550 providing a finger mounted surgical tool for the apparatus of FIG. 3A, according to an embodiment. As shown in FIG. 10A, the optical source 104 and optical detector 106 are mounted to the external surface of the housing 550. In one embodiment, the optical detector 106 is mounted closer to a tip of the housing 550 than the optical source 104. In one embodiment, the optical source 104 and the optical detector 106 are mounted to the housing 550 using an adhesive. In other embodiments, high-end fabrication is employed where the housing 550 has one or more integrated parts (e.g. an internal circuit board and/or fiber optic cables, etc.).

Hardware Overview

FIG. 13 is a block diagram that illustrates a computer system 1300 upon which an embodiment of the invention may be implemented. Computer system 1300 includes a communication mechanism such as a bus 1310 for passing information between other internal and external components of the computer system 1300. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit)). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1300, or a portion thereof, constitutes a means for performing one or more steps of one or more methods described herein.

A sequence of binary digits constitutes digital data that is used to represent a number or code for a character. A bus 1310 includes many parallel conductors of information so that information is transferred quickly among devices coupled to the bus 1310. One or more processors 1302 for processing information are coupled with the bus 1310. A processor 1302 performs a set of operations on information. The set of operations include bringing information in from the bus 1310 and placing information on the bus 1310. The set of operations also typically include comparing two or more units of information, shifting positions of units of information, and combining two or more units of information, such as by addition or multiplication. A sequence of operations to be executed by the processor 1302 constitutes computer instructions.

Computer system 1300 also includes a memory 1304 coupled to bus 1310. The memory 1304, such as a random access memory (RAM) or other dynamic storage device, stores information including computer instructions. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of computer instructions. The computer system 1300 also includes a read only memory (ROM) 1306 or other static storage device coupled to the bus 1310 for storing static information, including instructions, that is not changed by the computer system 1300. Also coupled to bus 1310 is a non-volatile (persistent) storage device 1308, such as a magnetic disk or optical disk, for storing information, including instructions, that persists even when the computer system 1300 is turned off or otherwise loses power.

Information, including instructions, is provided to the bus 1310 for use by the processor from an external input device 1312, such as a keyboard containing alphanumeric keys operated by a human user, or a sensor. A sensor detects conditions in its vicinity and transforms those detections into signals compatible with the signals used to represent information in computer system 1300. Other external devices coupled to bus 1310, used primarily for interacting with humans, include a display device 1314, such as a cathode ray tube (CRT) or a liquid crystal display (LCD), for presenting images, and a pointing device 1316, such as a mouse or a trackball or cursor direction keys, for controlling a position of a small cursor image presented on the display 1314 and issuing commands associated with graphical elements presented on the display 1314.

In the illustrated embodiment, special purpose hardware, such as an application specific integrated circuit (IC) 1320, is coupled to bus 1310. The special purpose hardware is configured to perform operations not performed by processor 1302 quickly enough for special purposes. Examples of application specific ICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a two-way communication coupling to a variety of external devices that operate with their own processors, such as printers, scanners and external disks. In general, the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1370 sends and receives electrical, acoustic or electromagnetic signals, including infrared and optical signals, that carry information streams, such as digital data.

The term computer-readable medium is used herein to refer to any medium that participates in providing information to processor 1302, including instructions for execution. Such a medium may take many forms, including, but not limited to, non-volatile media, volatile media and transmission media. Non-volatile media include, for example, optical or magnetic disks, such as storage device 1308. Volatile media include, for example, dynamic memory 1304. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1302, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1302, except for carrier waves and other signals.

Logic encoded in one or more tangible media includes one or both of processor instructions on a computer-readable storage media and special purpose hardware, such as ASIC*1320.

Network link 1378 typically provides information communication through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390. A computer called a server 1392 connected to the Internet provides a service in response to information received over the Internet. For example, server 1392 provides information representing video data for presentation at display 1314.

The invention is related to the use of computer system 1300 for implementing the techniques described herein. According to one embodiment of the invention, those techniques are performed by computer system 1300 in response to processor 1302 executing one or more sequences of one or more instructions contained in memory 1304. Such instructions, also called software and program code, may be read into memory 1304 from another computer-readable medium such as storage device 1308. Execution of the sequences of instructions contained in memory 1304 causes processor 1302 to perform the method steps described herein. In alternative embodiments, hardware, such as application specific integrated circuit 1320, may be used in place of or in combination with software to implement the invention. Thus, embodiments of the invention are not limited to any specific combination of hardware and software.

The signals transmitted over network link 1378 and other networks through communications interface 1370, carry information to and from computer system 1300. Computer system 1300 can send and receive information, including program code, through the networks 1380, 1390 among others, through network link 1378 and communications interface 1370. In an example using the Internet 1390, a server 1392 transmits program code for a particular application, requested by a message sent from computer 1300, through Internet 1390, ISP equipment 1384, local network 1380 and communications interface 1370. The received code may be executed by processor 1302 as it is received, or may be stored in storage device 1308 or other non-volatile storage for later execution, or both. In this manner, computer system 1300 may obtain application program code in the form of a signal on a carrier wave.

Various forms of computer readable media may be involved in carrying one or more sequence of instructions or data or both to processor 1302 for execution. For example, instructions and data may initially be carried on a magnetic disk of a remote computer such as host 1382. The remote computer loads the instructions and data into its dynamic memory and sends the instructions and data over a telephone line using a modem. A modem local to the computer system 1300 receives the instructions and data on a telephone line and uses an infra-red transmitter to convert the instructions and data to a signal on an infra-red a carrier wave serving as the network link 1378. An infrared detector serving as communications interface 1370 receives the instructions and data carried in the infrared signal and places information representing the instructions and data onto bus 1310. Bus 1310 carries the information to memory 1304 from which processor 1302 retrieves and executes the instructions using some of the data sent with the instructions. The instructions and data received in memory 1304 may optionally be stored on storage device 1308, either before or after execution by the processor 1302.

FIG. 14 illustrates a chip set 1400 upon which an embodiment of the invention may be implemented. Chip set 1400 is programmed to perform one or more steps of a method described herein and includes, for instance, the processor and memory components described with respect to FIG. *13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1400, or a portion thereof, constitutes a means for performing one or more steps of a method described herein.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1405 also stores the data associated with or generated by the execution of one or more steps of the methods described herein.

FIG. 15 is a diagram of exemplary components of a mobile terminal 1500 (e.g., cell phone handset) for communications, which is capable of operating in the system of FIG. 2C, according to one embodiment. In some embodiments, mobile terminal 1501, or a portion thereof, constitutes a means for performing one or more steps described herein. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile terminal functions that perform or support the steps as described herein. The display 1507 includes display circuitry configured to display at least a portion of a user interface of the mobile terminal (e.g., mobile telephone). Additionally, the display 1507 and display circuitry are configured to facilitate user control of at least some functions of the mobile terminal. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile terminal 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503 which can be implemented as a Central Processing Unit (CPU) (not shown).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile terminal 1501 as described herein. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the terminal. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile terminal 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable storage medium known in the art. The memory device 1551 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1549 carries, for instance, important information, such as the cellular phone number, the carrier supplying service, subscription details, and security information. The SIM card 1549 serves primarily to identify the mobile terminal 1501 on a radio network. The card 1549 also contains a memory for storing a personal telephone number registry, text messages, and user specific mobile terminal settings.

In some embodiments, the mobile terminal 1501 includes a digital camera comprising an array of optical detectors, such as charge coupled device (CCD) array 1565. The output of the array is image data that is transferred to the MCU for further processing or storage in the memory 1551 or both. In the illustrated embodiment, the light impinges on the optical array through a lens 1563, such as a pin-hole lens or a material lens made of an optical grade glass or plastic material. In the illustrated embodiment, the mobile terminal 1501 includes a light source 1561, such as a LED to illuminate a subject for capture by the optical array, e.g., CCD 1565. The light source is powered by the battery interface and power control module 1520 and controlled by the MCU 1503 based on instructions stored or loaded into the MCU 1503.

FIGS. 16-19 show an example of spectrofluorometer 1600 system that includes finger mount module 1602 adapted for securement via a strap 1603 on top of a finger 1604 and a wrist module 1605. The finger mount module 1602 includes an LED 1606 pertaining to basic common cathode RGB led with a translucent bulb and a photodiode sensor 1608. The wavelength required to excite fluorescein is 460 nm which can be simulated with an RGB LED by combining power levels of each individual red, green, and blue diodes. Because RGB values for image computing are 8 bit, their maximum relative intensity is 255. Creating a color of light with the wavelength of 460 nm requires RGB values (0,123, 255).

Figure 20:
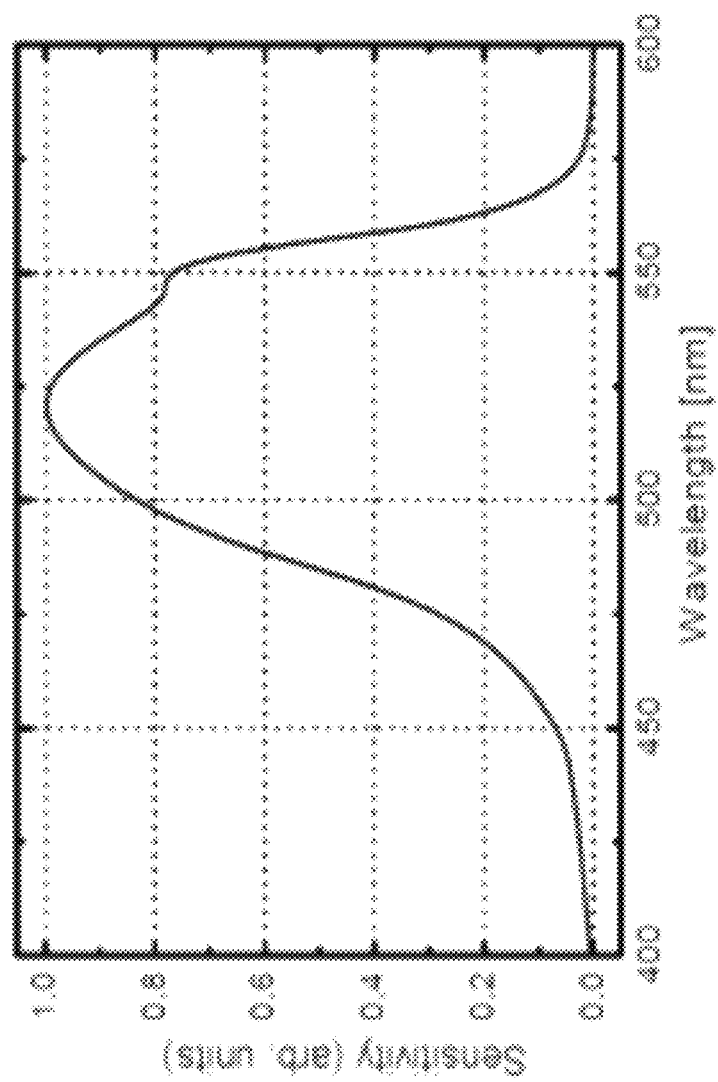
FIG. 20 provides a graph showing sensitivity of a photodiode sensor used in the system shown in FIG. 16.

The photodiode sensor 1608 implemented in this example pertains to a Marktech Opotoelectronics MTD5052N, though other types may be implemented based on the teachings herein. The photodiode sensor 1608 has a peak sensitivity wavelength of 525 nm with over a 90% sensitivity at the fluorescein emission wavelength of 515 nm (see FIG. 20). The photodiode sensor 1608 in this example does not directly measure the fluorescence of the tissue because fluorescence is not typically an absolute measurement. Intensities of a fluorophore's excitation phase is measured relative to the intensity of light emitted by a control sample. However, those skilled in the art will appreciate that obtaining measurements of intensity is not directly required for the functionality of the detector; only the detection of a difference in light intensity is needed for the code and sensor to properly locate.

The finger mount module 1602 includes two halves of a 3D printed Onyx casing 1609 for the LED (1606) photodiode sensor (1608). The casing 1609 has two hole inserts 1611 and 1613; one for the LED 1606 and one for the photosensor diode 1608. The backside is open for the wiring 1616 to attach to the wrist module 1605. The strap 1603 goes around the finger mount module 1602 and allows for securement to a finger of the user.

The wrist module 1605 (FIG. 18) as shown is a 3D printed PLA container for the prototype board with velcro strand 1614 to attach to the users arm. The front hole 1615 is wide enough for the wiring 1616 to fit through and connect to the finger mount module 1603. The opening 1617 in the back is for a power cable 1618 (see FIG. 16).

Figure 19:
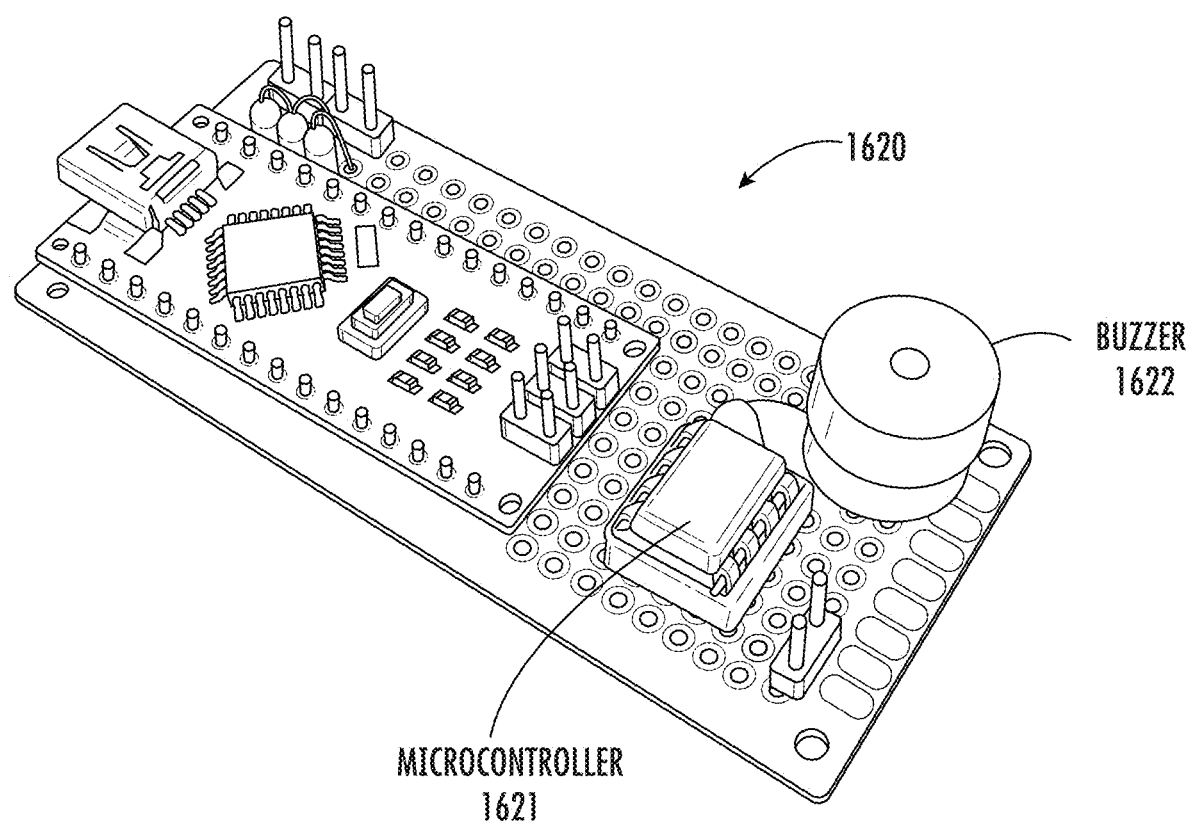
FIG. 19 shows a circuit board that is secured into the wrist mount module shown in FIG. 18.

FIG. 19 shows an Arduino circuit board 1620 that includes a microprocessor 1621 (e.g., TL081 operational amplifier (OpAmp)), and a piezo electric buzzer 1622. The circuit board 1620 sends power to the LED 1606, reads the output from the microprocessor 1621, and controls the buzzer.

Figure 21:
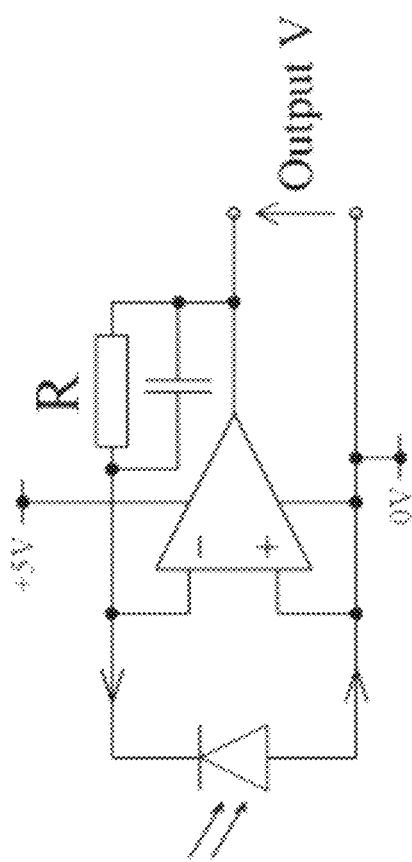
FIG. 21 shows a circuit diagram implemented in the circuit board shown in FIG. 19.

The photodiode sensor 1608 alone will produce a current when light shines on it. However, the values at a maximum will be in the nA range, too small for any practical measurement tools. Microprocessor 1621 includes an amplifier circuit (FIG. 21) that is configured to "amplify" the current produced from the photodiode sensor 1608 by outputting a proportional voltage. Since the microprocessor 1621 measures voltages from 0 to 5V, values on the nanoamphere range are amplified by a factor of at least 107 which requires a 10 MΩ resistor. There is also a 100 pF capacitor in parallel with the resistor to act as a passive noise filter when measuring the output voltage.

To obtain positive values from the microprocessor 1621, the photodiode sensor 1608 has its polarity reversed so the cathode is connected to ground. Consequently, an increase in light intensity detected by the photodiode will return a drop in voltage output for the Arduino circuit board 1620 to detect, see formula I below.

$$V_{out} = 1_{ph} \times R \qquad (1)$$

Figure 22:
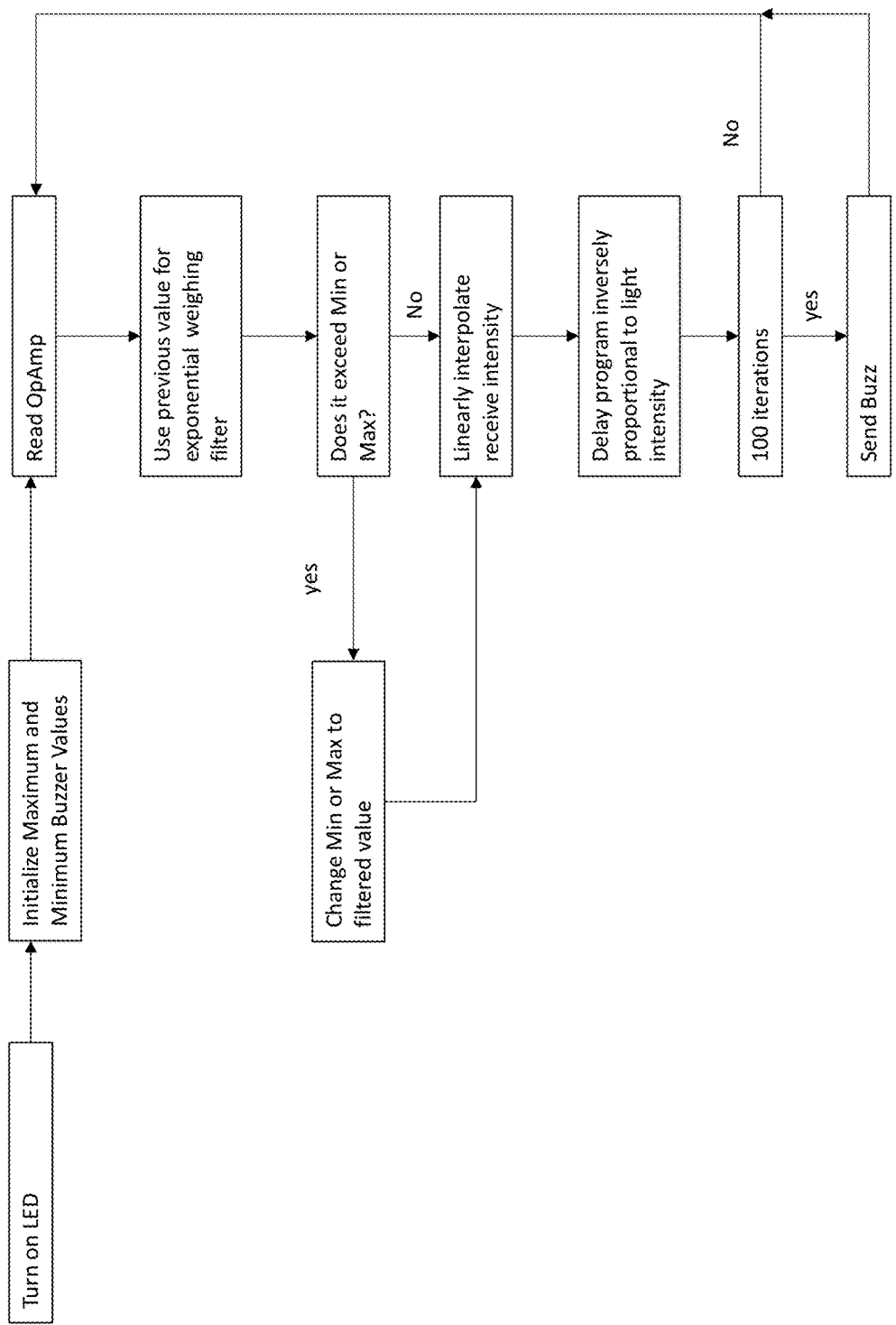
FIG. 22 shows an example algorithm executed by the microprocessor of circuit board shown in FIG. 19.

In an example shown in FIG. 22, the Arduino circuit board 1620 operates according to the algorithm that starts with initializing the pins, variables, counters, and booleans required for the code to operate. The setup( ) function defines what pins are inputs or outputs and sets up the Parallax Data Acquisition tool (PLX-DAQ) serial ouput for Nano to Excel communication. The PLX-DAQ is an Excel macro that connects to the microprocessor and can directly populate the sheet with real-time values from the serial output without having an external device connected to the circuit. The loop( ) function starts by turning the RGB LED on, and records the output voltage from the microprocessor for about 2.5 seconds to initialize what voltage values correlate to ambient light levels for any environment the photodiode sensor 1608 is operating within. This average is set to the maximum value the diode should detect and the minimum value is taken to be 0.01V less than this value. After testing the photosensor diode 1608 in multiple settings, it was found that the average difference between the voltage read at ambient light levels and the voltage read at maximum light levels was about 0.1V, but the code implements an extreme value editor for instances where any measured voltages exceed the minimum or maximum.

Figure 23:
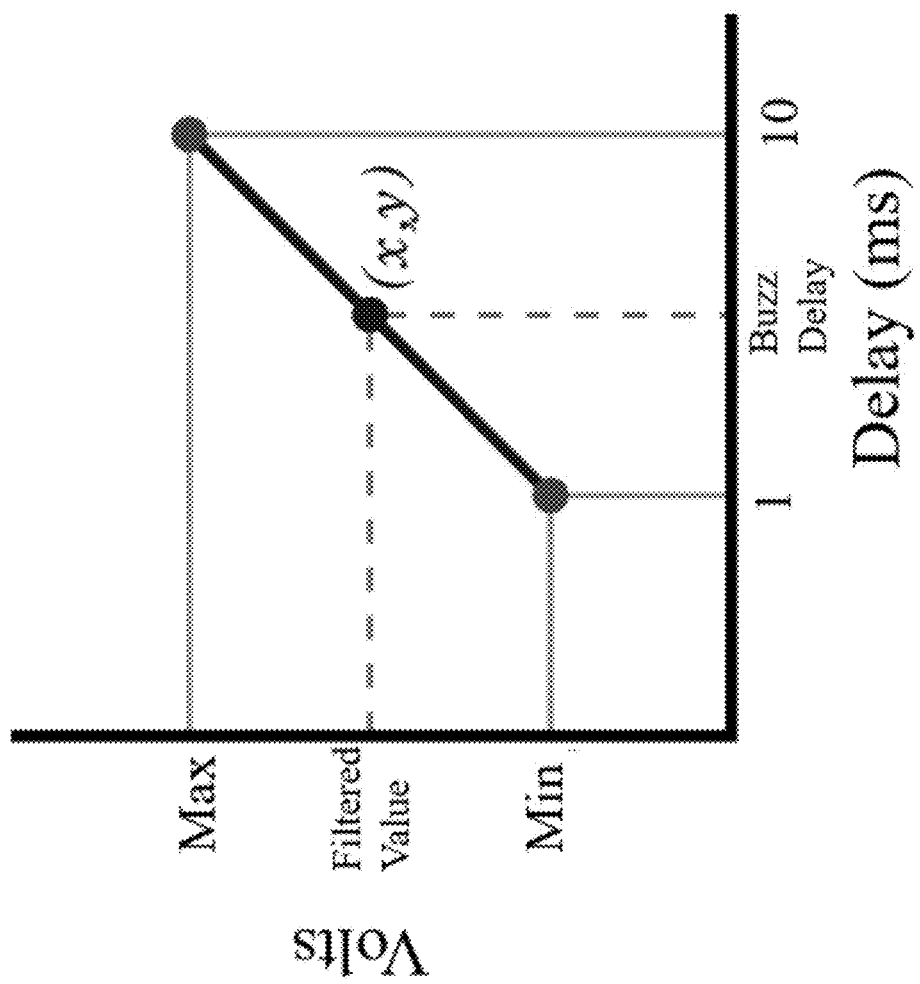
FIG. 23. shows a graph showing the linear interpolation relating voltages to delays as executed by the microprocessor of the circuit board shown in FIG. 19.

With the minimum and maximum voltages corelated to a minimum and maximum delay, the arduino map( ) function linearly interpolates the next filtered value read from the microprocessor and assigns it a delay which extends the time between each consecutive buzz (FIG. 23).

Figure 24:
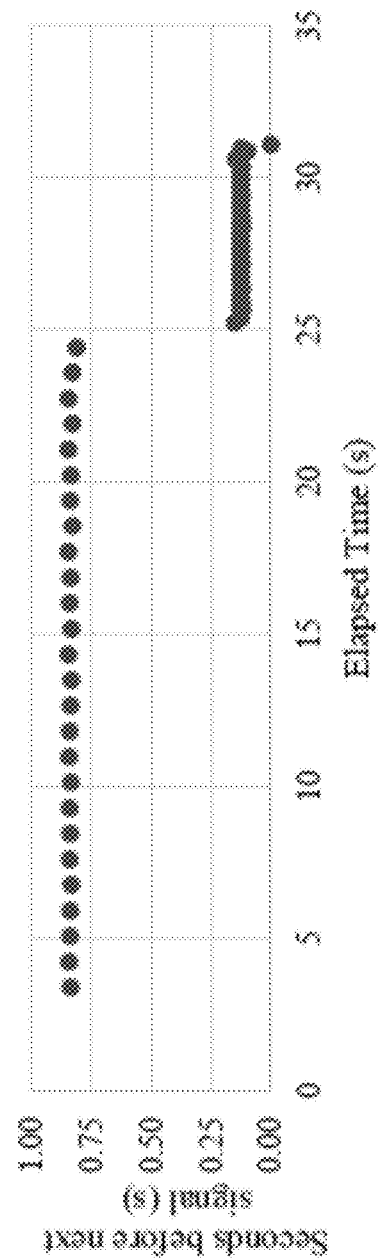
FIG. 24 shows a graph illustrating test results of max and min signal frequency testing of the system shown in FIG. 16.

With the buzz delay ranging from 1 to 10 milliseconds and returning a buzz every 100 iterations, the maximum frequency of the buzzer should be 1 Hz and the minimum should be 10 Hz. FIG. 24 shows the change in time before the next buzzer signal over a 32 second span with the sensor pointed away from it's light source for 25 seconds, and the sensor pointed directly at its light source for 5 seconds; these simulate the sensor reacting at its slowest and fastest rates. The actaul frequencies of the buzzer signal were 1.2 Hz and 8.1 Hz at the maximum and minimum delay, respectively. This is due to the noise experienced during the 100 iterations. Table I summarizes the findings and results.

|  | Sensor pointing away | Sensor facing light |
| --- | --- | --- |
| Signal Instances | 25 | 46 |
| Elapsed Time (s) | 21.032 | 5.707 |
| Signal Frequency (Hz) | 1.2 | 8.1 |

Alternatives, Deviations and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

What is claimed is:

1. An apparatus comprising:
    a housing configured to be mounted to a body of a user;
    an electrode coupled to the housing such that a tip of the electrode is configured to move from a first position relative to the housing to a second position relative to the housing;
    a power source electrically connected to the electrode;
    a processor communicatively coupled with the power source;
    at least one memory including one or more sequences of instructions,
    the at least one memory and the one or more sequences of instructions configured to, with the at least one processor, cause the apparatus to perform at least the following,
        receive a first signal from a first user input device based on a first user input received from the user;
        transmit a second signal to the power source to cause the power source to deliver electrical power to the electrode based on the received first signal;
        receive a third signal from the first user input device based on an input received from the user; and
        transmit a fourth signal to the power source to cause the power source to stop delivering electrical power to the electrode based on the received third signal;
    wherein the housing comprises:
        a first housing configured to be mounted to a finger of the hand;
        a first attachment slidably received within a first slot defined by the first housing, wherein the first attachment defines a slot or opening to receive the electrode:
        a second housing configured to be mounted to a wrist of the hand: and
        a second attachment slidably received within a second slot defined by the second housing, wherein the second attachment defines a slot or opening configured to pass electrical cables connected to the electrode.

2. The apparatus as recited in claim 1, further comprising the first user input device communicatively coupled to the processor, wherein the first user input device comprises a foot pedal.

3. The apparatus as recited in claim 1, further comprising a second user input device operatively coupled to the electrode and configured to move the electrode tip from the first position to the second position based on a second user input received at the second user input device.

4. The apparatus as recited in claim 1, wherein the electrode is positioned within the housing such that the tip of the electrode moves from the first position within the housing to the second position outside the housing.

5. The apparatus as recited in claim 1, further comprising a spring operatively connected to the electrode such that the spring is configured to move from a first compressed position when the electrode tip is in the first position to a second expanded position when the electrode tip is in the second position.

6. The apparatus as recited in claim 1, wherein the apparatus further includes:
    a video camera positioned within the housing, said video electrically connected to the power source and communicatively coupled with the processor;
    wherein the second signal transmitted to the power source is further configured to cause the power source to deliver electrical power to the video camera to cause the video camera to capture image data.

7. The apparatus as recited in claim 1, wherein the apparatus housing further includes a vacuum line positioned in a port defined by the housing, said vacuum line in flow communication with a vacuum device and configured to clear vapors from a region adjacent the electrode tip in the second position.

8. The apparatus as recited in claim 1, wherein the housing defines a plurality of ports;
    wherein the electrode is positioned in a first port of the plurality of ports;
    wherein the apparatus further includes a video camera positioned within a second port of the plurality of ports, said video camera electrically connected to the power source and communicatively coupled to the processor; and
    wherein the apparatus further includes a vacuum line positioned within a third port of the plurality of ports, said vacuum line in flow communication with a vacuum device and configured to clear vapors from a region adjacent the electrode tip in the second position.

9. The apparatus as recited in claim 1, wherein the first slot is a T-shaped slot and wherein the first attachment includes a T-shaped extension configured to be slidably received within the T-shaped slot.

10. The apparatus as recited in claim 9, wherein the apparatus further includes a vacuum line positioned in a second opening or second slot defined by the first attachment, said vacuum line in flow communication with a vacuum device and configured to clear vapors from a region adjacent the electrode tip in the second position.

11. The apparatus as recited in claim 1, wherein the electrode includes a lever that is configured to move the electrode from the first position to the second position upon actuation of the lever, and wherein the first housing is configured to be rotated relative to the finger tip from a first orientation where the electrode is positioned above the fingertip to a second orientation where the electrode is positioned below the fingertip.

* * * * *